US008848969B2

(12) United States Patent
Ramsdell et al.

(10) Patent No.: US 8,848,969 B2
(45) Date of Patent: Sep. 30, 2014

(54) METHODS AND APPARATUS FOR WATERMARKING AND DISTRIBUTING WATERMARKED CONTENT

(75) Inventors: Scott Ramsdell, Charlotte, NC (US); Craig Mahonchak, Broomfield, CO (US); Bryan Santangelo, Tulsa, OK (US)

(73) Assignee: Time Warner Cable Enterprises LLC, New York, NY (US)

( * ) Notice: Subject to any disclaimer, the term of this patent is extended or adjusted under 35 U.S.C. 154(b) by 259 days.

(21) Appl. No.: 13/245,316

(22) Filed: Sep. 26, 2011

(65) Prior Publication Data

US 2012/0308071 A1    Dec. 6, 2012

Related U.S. Application Data

(60) Provisional application No. 61/493,727, filed on Jun. 6, 2011.

(51) Int. Cl.
*G06K 9/00* (2006.01)
*H04N 1/32* (2006.01)
*G06T 1/00* (2006.01)

(52) U.S. Cl.
CPC .......... *G06T 1/0021* (2013.01); *H04N 1/32144* (2013.01)
USPC ....................................................... 382/100

(58) Field of Classification Search
CPC ................ G06F 17/3089; G06F 21/10; G06F 2221/0733; G06F 2221/0737; G10L 19/018; H04N 21/23892; H04N 21/44204; H04N 21/8358; H04N 21/8456
USPC ....................................................... 382/100
See application file for complete search history.

(56) References Cited

U.S. PATENT DOCUMENTS

| 8,151,357 B2* | 4/2012 | Ueda et al. ............ 726/26 |
| 8,230,343 B2* | 7/2012 | Logan et al. .......... 715/723 |
| 2003/0056101 A1 | 3/2003 | Epstein |
| 2003/0187798 A1* | 10/2003 | McKinley et al. ...... 705/50 |
| 2003/0190054 A1 | 10/2003 | Troyansky et al. |
| 2004/0064416 A1 | 4/2004 | Peled et al. |
| 2005/0196051 A1 | 9/2005 | Wong et al. |
| 2007/0118873 A1 | 5/2007 | Houh et al. |

OTHER PUBLICATIONS

International Search Report from International Application No. PCT/US2012/040944, pp. 1-4, dated Feb. 27, 2013.
Written Opinion of the International Searching Authority from International Application No. PCT/US2012/040944, pp. 1-5, dated Feb. 27, 2013.

* cited by examiner

*Primary Examiner* — Tom Y Lu
(74) *Attorney, Agent, or Firm* — Straub & Pokotylo; Michael P. Straub; Stephen T. Straub

(57) ABSTRACT

Methods and apparatus for generating and distributing watermarked content are described. Content to be distributed is sliced into a plurality of segments, e.g., short portions. Individual segments are subjected to watermarking with multiple watermarked versions of a segment being generated. Different watermarked versions of a segment communicate different information, e.g., one or more numbers. Sets of watermarked segments corresponding to a program are supplied to a content distribution device. Based on a session number or other information corresponding to the destination of the content, the content distribution device selects watermarked segments from the sets of segments to provide to the user. The combination of segments communicates, via the watermarks, a sequence of numbers used to identify the streamed content without requiring the distribution node to perform image processing to generate the watermarks. When the segments are communicated sequentially, the watermarks can be detected and the identifying numerical sequence extracted.

20 Claims, 15 Drawing Sheets

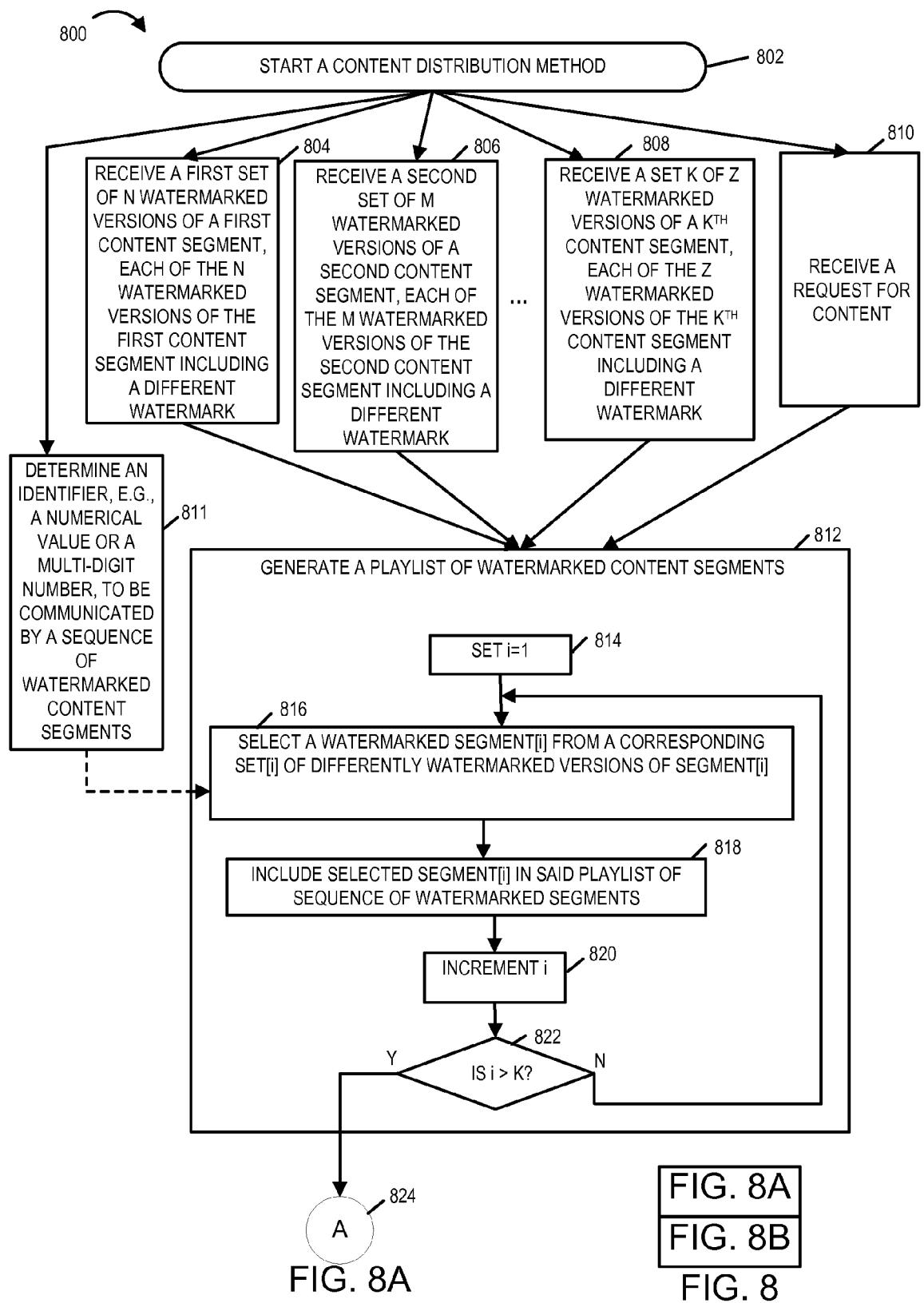

METHODS AND APPARATUS FOR WATERMARKING AND DISTRIBUTING WATERMARKED CONTENT

RELATED APPLICATIONS

The present application claims the benefit of U.S. Provisional Patent Application Ser. No. 61/493,727, filed Jun. 6, 2011 which is hereby expressly incorporated by reference.

FIELD

The present invention relates to watermarking of content and/or the distribution of watermarked content, e.g., digital video and/or audio content such as, for example, movies, television programs, etc.

BACKGROUND OF THE INVENTION

Video is normally a sequence of images, e.g., video frames. Digital television commonly refers to the digital representation of a rapid sequence of digitized photographic images, e.g., video, or parts thereof in synchronization with one or more digitized audio streams. The streams may be broadcast, as with live programming and many television programs, or played back from a digital recording on a per user basis as with the current Video On Demand (VOD) technology.

The storage of digital television images has converged on the use of the Motion Picture Expert Group (MPEG)'s standards. The standardization allowed for tremendous industry growth in the sale and distribution of digital television.

When digital television is distributed there is often a need to inject advertisements periodically. It is also necessary to inject different advertisements to different viewers as some advertisements may not be geographically relevant to some groups. E.g. advertisements for an automotive shop that is 900 miles away. In order to not have to manually stop the transmission of the primary video, play the advertisement, and then restart the primary video, a mechanism known as a playlist has evolved.

Prior to transmitting video content to a given geographic area, the primary video content will be sectioned in locations where advertisements wish to be shown. The location of each section is then placed in an array with the locations of the desired advertising video inserted between the locations of sections of primary content. The entire array is then sent to a video server which transmits the pieces of content in order. The end effect is that the viewer of the program experiences a seamless presentation of video with interspersed advertisements. One can see that this mechanism affords great flexibility as the location description for different advertisements may be swapped out each time the video is played or when it needs to be sent to geographically distant locations.

When video content is distributed via an MPEG stream or an IP encapsulated MPEG stream, it is often referred to as streaming media. The data that is the digital representation of the television image is often referred to as digital content or digital media. In order to protect copyright owners, various techniques for the encryption, watermarking, or fingerprinting of digital media have come into play. Collectively, these technologies are called Digital Rights Management (DRM) mechanisms.

Digital encryption is a process in which the series of numbers that make up the digital television content, e.g., pixel values used to represent a frame, are run through an encryption program. The encryption is such that the receiver of the data has access to the encryption key and may decrypt the content so that it may be viewed.

Along with digital encryption, industry has developed various methods to identify a copyrighted work by numerical analysis of the content. Developers have invented numerous mechanisms to extract the unique characteristics of the content such that their algorithms produce a unique digital signature for each different piece of content. The unique digital signature is often referred to as a digital fingerprint.

Digital watermarking embeds a unique identifier within digital content. Very elaborate mechanisms have evolved including those that modify the compression coefficients of the digital content or even modifying the last few significant bits of the individual frames such that they contain sequences of identifiable numbers. Some watermarking techniques alter pixel values of images providing luminance and/or chrominance information thereby slightly altering an image in a manner that is difficult or impossible to detect with the naked eye but which can be detected and interpreted as a numerical value or sequence of values from digital analysis of the image data.

One issue with the application of digital watermarks is the need for enormous computational resources in order to add the watermark in such a fashion so that it goes undetected by those who wish to defeat it. For example, to embed a number within an image as minor image luminescence changes within the horizontal and vertical confines of the image may require the complete decoding of the image, the application of a transform used to introduce the desired watermark, and the re-encoding of the content on a frame by frame basis. When streaming thousands of videos per day, the cost of the watermarking equipment which would be required to watermarking individual frames of each video stream, by altering image content within a frame in real time, can become exorbitant.

In view of the above discussion, it should be appreciated that there is a need for improved methods and apparatus for introducing information through the use of watermarks into video streams. It should be appreciated that there could be significant cost savings and reductions in hardware requirements if methods and/or apparatus could be developed which would avoid the need for altering image content, e.g., frames, for watermarking purposes at the time the frames are streamed. While not necessary for all embodiments, it would be highly desirable if watermarking equipment used to alter images, e.g., frames, was not required at individual distribution sites but could be located at a centralized or regional location used to supply content to content stores from which content could be streamed, e.g., on demand.

SUMMARY

Various embodiments are directed to methods and apparatus for generating content streams, e.g., video content streams, communicating information through the use of watermarks and for supplying the generated content streams to user devices, e.g., customer premise devices.

In one exemplary embodiment, the system includes a watermarking apparatus, and at least one streaming apparatus with access to a content store including watermarked content. The streaming apparatus in turn is coupled to one or more receivers, e.g., user devices such as set top boxes, mobile devices and/or televisions, via a communications network such as a cable network.

In accordance with one exemplary embodiment, the watermarking apparatus is incorporated into a content distribution node, e.g., a package media gateway, that supplies content to a plurality of different regional content stores from which the content is distributed. The content stores may be located at, e.g., cable network headend offices which serve as regional distribution sites from which content is streamed, e.g., in response to one or more user requests for content. The requests for content may, and in some embodiments are, video on-demand (VOD) requests.

The methods and apparatus of the present invention allow video content to be pre-watermarked and combined in such a manner that the combination of watermarked content which is streamed provides information which can be used to identify the location to which the content is being streamed and, in some cases, identify the communications session in which the content is being supplied. Significantly, the content identification methods of the present invention may be implemented without the use of an image watermarking apparatus at the content distribution system which streams the content and without the need to perform complex image processing, e.g., decoding, image manipulation and re-encoding of a frame, at the site from which content is streamed. In fact, the methods and apparatus of present invention allow a watermarking apparatus to be shared between a large number of regional distribution systems since real time watermarking of image content at the time of content streaming to a customer premise is not required.

In accordance with one feature of the present invention, the watermarking apparatus slices video content into multiple sections, referred to as segments, and then produces multiple copies of each section. A segment in some embodiments is a frame or set of frames. The watermarking apparatus watermarks each segment with a unique identifier. Thus, multiple differently watermarked versions of each content segment are produced via the slicing, copying and watermarking operations. As a result of the watermarking operation, for each program or piece of content a set of watermarked content is produced. The set of watermarked content includes a plurality of segments. In one embodiment a set of differently watermarked segments is provided in the set of watermarked content for each segment of a piece of content.

A streaming apparatus may receive a request from a user for video content and respond by generating a session identifier or another identifier. In some embodiments the identifier is a unique stream session ID. Based on the generated identifier, the streaming apparatus generates a list of the elements, e.g., watermarked segments, that make up a complete copy of the requested video. The list of elements to be streamed includes one watermarked copy of each segment of the requested video with the particular watermarked copy of the segment being selected based on the identifier value to be indicated by the watermarks communicated by the sequence of selected watermarked segments.

Thus, the sequence of numbers communicated by the watermarks of the selected segments, represent and/or otherwise communicate the identifier corresponding to the session used to stream the requested content. The list of elements may be in the form of a playlist which identifies which watermarked segments are to be streamed and the order in which they are to be streamed.

As part of the content streaming process, the streaming apparatus outputs one of the watermarked segments from each of the sets of differently watermarked segments corresponding to the requested content thereby providing a single copy of the content but with a combination of watermarked segments which communicate information, e.g., a sequence of numerical values via the watermarks.

Note that the session ID is one example of information that may be communicated. The sequence of watermarks can be used to communicate any type of data desired. For example, in some embodiments the sequence of watermarks is used to communicate the ID of the organization streaming the content, the geographic area the content is streamed to, and/or a time stamp indicating when the requested content was streamed and/or the particular customer device to which the content was streamed.

One or more embodiments may have one or more of the following advantages or capabilities:
  allowing content distributors to watermark each stream of content with a different watermark without the need for large, expensive computational resources;
  allowing content distributors to watermark streams by geographic area.
  allowing for easy modification of the information that is watermarked in the content; and/or
  allowing for a lower cost modification of the watermarking mechanism by having to purchase fewer watermarking devices that if each individual stream were watermarked "on-the-fly."

An exemplary content distribution method, implemented in accordance with the invention, comprises, in some embodiments: receiving N watermarked versions of a first content segment, each of the N watermarked versions of the first content segment including a different watermark, N being a positive integer greater than 1; receiving M watermarked versions of a second content segment, each of the M watermarked versions of the second content segment including a different watermark, M being a positive integer greater than 1; and providing, in response to a request for content, a sequence of watermarked content segments including one of said N watermarked versions of the first content segment and one of said M watermarked versions of the second content segment, the sequence of watermarked content segments communicating a corresponding sequence of watermarks providing information identifying content supplied in response to said request for content. The content distribution method may be implemented by a headend or other node or distribution point which receives the sets of watermarked versions of content segments from a watermarking system.

In some embodiments the watermarking system is implemented as part of a content distribution node, such as a package media gateway that distributes content to multiple regional headend offices for subsequent distribution to customer premises.

In addition to streaming content with watermarks, the system of the present invention generates a database with watermark information and a record of what content was streamed and when. From the record it is possible to subsequently associate a sequence of numbers communicated by a watermarked content that is streamed with information identifying a particular communications session and the device to which the content was streamed. This facilitates identification of users and/or systems which may have been used to copy and distribute content in violation of digital rights and/or contractual restrictions on the use and distribution of the streamed content.

While the methods and apparatus of the present invention are well suited for generating watermarks for prerecorded content, e.g., movies and/or other content from a on-demand content library, the techniques can also be used with real time broadcasts, e.g., broadcasts which are transmitted while the original live event is still ongoing. In the case of real time broadcasts the real time broadcasts are often transmitted with some previously recorded content being inserted between portions of the real time broadcast and/or portions of the images included in the real time broadcast being generated from previously recorded content. For example, pre-recorded advertisements or logos may, and in some embodiments are, inserted into the real time broadcasts. In accordance with the invention, in some embodiments multiple watermarked versions of the advertisements, logos and/or other pre-recorded content to be combined with the real time content is created prior to the broadcast. Thus, at least in some embodiments multiple differently watermarked versions of one or more advertisements or logos are created, e.g., with the differently watermarked versions of an advertisement or logo communicating different numbers. The prerecorded watermarked content is selectively combined with the real time broadcast, e.g., on the fly at the time of the real time broadcast. For example, one of multiple differently watermarked copies of a series of advertisements may, and in some embodiments are, inserted between the frames of a real time broadcast. The sequence of watermarked values communicated by the inserted series of advertisements can, and in some embodiments does, serve to identify the real time broadcast stream without having to actually watermark the real time content, e.g., sports content, as the real time images are generated.

The same technique can be applied to logos or other content which is generated prior to the real time event. Multiple differently watermarked versions of multiple logos or images are combined, in some embodiments, with the real time images. By selecting which copy of a watermarked logo or image is combined with the real time content, the previously generated watermark is incorporated into one or more real time images without having to generate the watermark in real time.

In various embodiments, the sequence of watermarks coveys a number or other identification information which can be used to identify the real time content broadcast on a per stream basis without having to generate the watermarks for each of the different streams in real time. Thus, by using conventional advertisement and/or logo insertion techniques and a plurality of differently watermarked versions of advertisements or logos to be inserted, watermarking of real time content streams is possible using the methods of the present invention without having to provide the ability to generate watermarks in real time. Thus one or a few centrally located watermarking apparatus can be used to support watermarking of a large number of content streams by generating watermarked advertisements and/or logos prior to the real time broadcast.

While it is possible to watermark each frame or image of a content stream, it should be appreciated that it is not necessary to do so and that including watermarks in a subset of the images or frames is satisfactory in many implementations. The number of different watermarks generated for each frame or segment can vary and need not be the same for an entire program. Furthermore different portions of a content stream can communicate different watermark sequences. For example, advertisements within a broadcast may communicate one sequence of watermarks while the main program may communicate a different sequence of watermarks. Thus, it should be appreciated that different sets of frames and/or images may be treated as corresponding to or communicating different sets or sequences of watermarked values. For example, odd frames could correspond to one sequence or set of watermarked information and even frames to another sequence of watermarked information.

The sequence of values communicated by the selection and inclusion of watermarked versions of a frame or image may repeat within a program so that all or a portion of a identification sequence communicated through the use of watermarks may be conveyed using relatively few frames and/or can be repeated multiple times throughout a program or other piece of streamed content.

Numerous additional features and advantages of the present invention are discussed in the detailed description which follows.

DETAILED DESCRIPTION

Figure 1:
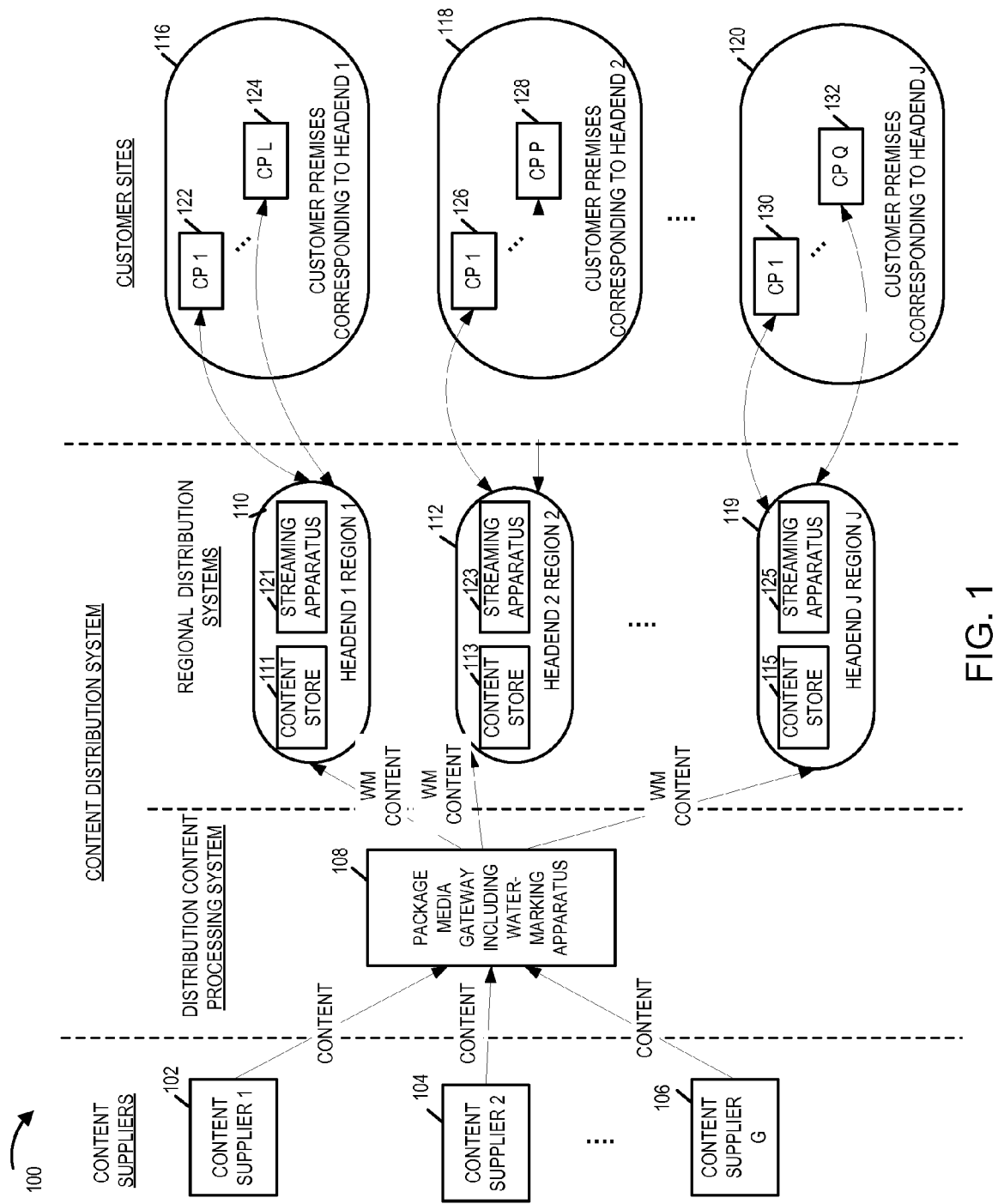
FIG. 1 illustrates an exemplary system 100 implemented in accordance with one exemplary embodiment of the invention.

FIG. 1 illustrates an exemplary system 100 implemented in accordance with one exemplary embodiment of the invention. The exemplary system includes one or more subsystems which may be physically located at different locations. The one or more subsystems shown in the system 100 communicate and/or exchange information over one or more communications network, e.g., cable network, internet etc.

The system 100 includes a plurality of content suppliers 102 through 106 as shown. The content suppliers 102 through 106 supply content, e.g., movies and/or other programming content to a distribution content processing system including an exemplary package media gateway (PMG) 108. The PMG 108 includes a watermarking apparatus that performs a content segmentation and a watermarking operation on the content received from one or more content suppliers, in accordance with the invention. The operations and processing performed by the exemplary PMG 108 is discussed later in greater detail. Following the processing performed by the PMG 108, the watermarked content (shown as WM content) is distributed to a plurality of regional distributions systems including headend 1 corresponding to region 1 110, headend 2 corresponding to region 2 112, . . . , headend J corresponding to region J 119. The headends 110 through 119 store the received WM content in their respective content stores 111 through 115 respectively. Each headend includes a content store and corresponding streaming apparatus (111, 121) (113, 123) (115, 125). The streaming apparatus as will be discussed below may include a VOD application sever for generating playlists of watermarked content segments and a content server, e.g., VOD server, for streaming content in accordance with the generated playlists.

The exemplary system 100 further includes a plurality of customer sites with customer premises (CP) corresponding to the plurality of regional service provider systems, i.e., headends 110 through 119. The first set 116 of customer premises correspond to customers served by region 1 headend 110. The first set 116 includes a plurality of customers premises including CP 1 122 through CP L 124. The set 118 of customer premises correspond to customers served by region 2 headend 112. The set 118 includes a plurality of customers premises including CP 1 126 through CP P 128. Similarly the set 120 of customer premises correspond to customers served by region J headend 119. The set 120 includes a plurality of customers premises including CP 1 130 through CP Q 132. Thus each regional service provider system, e.g., headend 110, 112, . . . 119, provides services, e.g., content delivery services, via a communications network, to a corresponding set of customer premises which correspond to the region serviced by the particular headend. In accordance with one aspect of the invention, each headend forms a sequence of watermarked versions of content segments received from the PMG 108, and supplies the sequence of watermarked content segments to one or more customers premises which correspond to the region serviced by the particular headend. In various embodiments the sequence of watermarked content segments is supplied by a headend to a customer premise device, e.g., a set top box, in response to a request for content from the customer.

Figure 2:
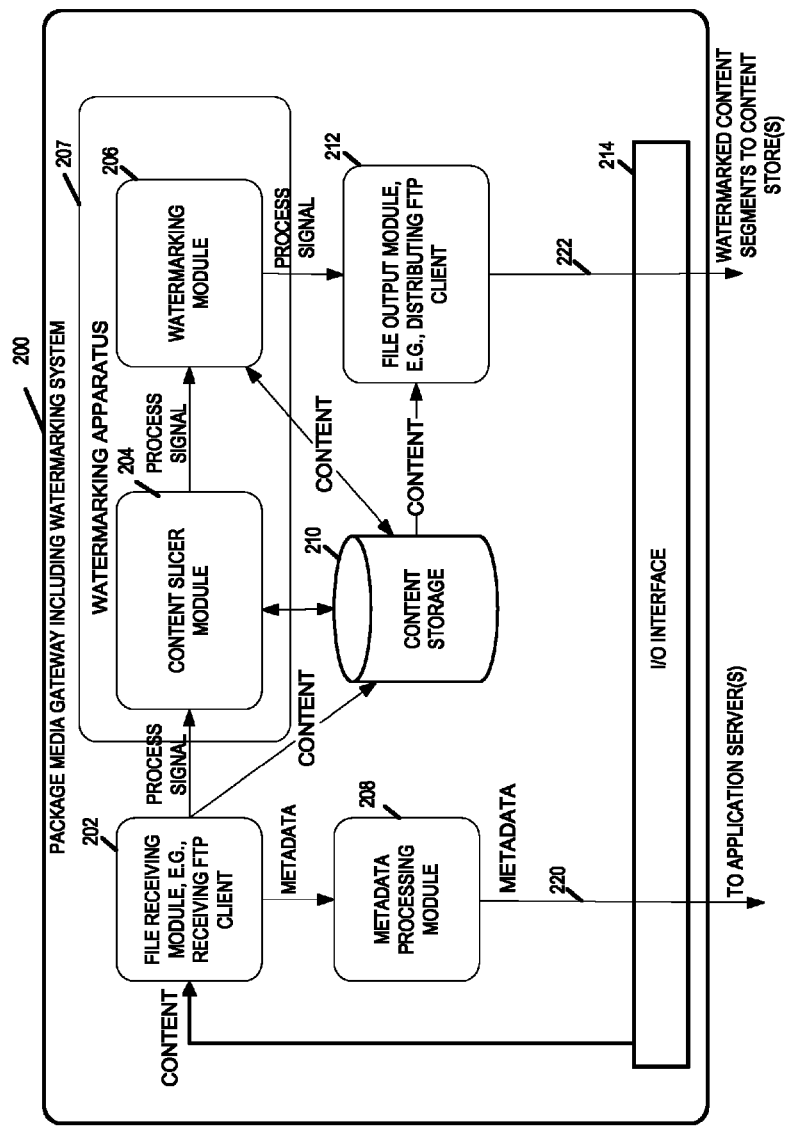
FIG. 2 illustrates a functional diagram of an exemplary package media gateway illustrating some functions and/or operations performed by the exemplary package media gateway or one or more elements therein, in accordance with one embodiment of the invention.

FIG. 2 illustrates a functional diagram 200 illustrating some functions and/or operations performed by an exemplary package media gateway (PMG) 200 or one or more elements of the PMG 200, in accordance with one embodiment of the invention. The package media gateway 200 can be used as the PMG 108 illustrated in FIG. 1 example. The exemplary PMG 200 includes a file receiving module 202, a content slicer module 204, a watermarking module 206, a metadata processing module 208, content storage 210, a file output module 212, and an I/O (input/output) interface 214. In accordance with one aspect of some embodiments the PMG 200 operates as a content watermarking and distribution device which distributes watermarked content segments to a plurality of regional content distribution systems, e.g., regional headends. The content slice 204 and watermarking module 207, in combination, form a watermarking system 207. In various embodiments such as the one shown in FIG. 2, the PMG 200 performs slicing, watermarking, and distribution of content one or more content store, e.g., located at network headends.

In accordance with one aspect of some embodiments the PMG 200 receives content, e.g., corresponding to one or more movies and/or programs, from at least one content supplier, e.g., supplier 102. The content from the at least one supplier 102 is received and processed by the file receiving module 202. In some embodiments the received content is temporarily stored in the content storage 210. It should be appreciated that the received content may, and normally does, include some content which is to be watermarked and other content which does not have to be watermarked.

The content slicer module 204 is responsible for slicing the received content which is to be watermarked into content segments in accordance with the invention. In some embodiments the content slicer module 204 accesses the received content stored in the storage 210 and performs a segmentation operation to a plurality of segments of the received content to be watermarked. In one embodiment the plurality of content segments include at least a first content segment and a second content segment.

Figure 4:
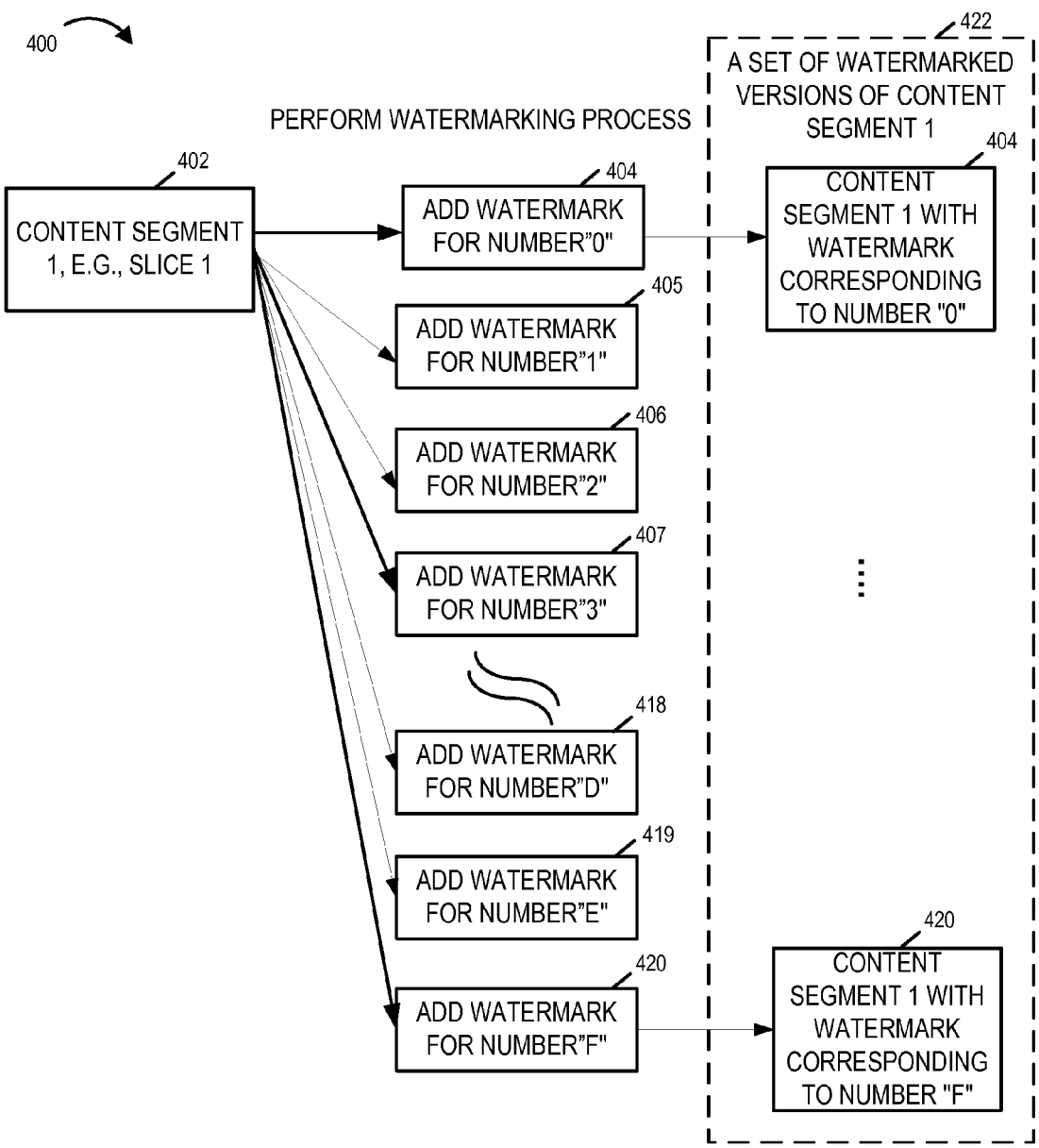
FIG. 4 illustrates an example showing an exemplary watermarking operation performed on an individual content segment corresponding to some content received by a package media gateway, in accordance with one embodiment of the invention.

The content segments are then fed individually to the watermarking module 206 to generate sets of watermarked versions of each individual content segment. Thus in some embodiments the watermarking module 206 generates a set of watermarked versions of each individual content segment. An exemplary set of watermarked versions of an individual content segment 1 is illustrated in FIG. 4.

The metadata processing module 208 identifies and processes the metadata associated with the received content. In some embodiments the metadata is embedded in the received content. The metadata processing module extracts the metadata and performs processing to put the metadata in a format suitable for sending (as shown using arrow 220) to one or more application servers corresponding to one or more different regional headends such as headends 110 through 114. The file output module 212 in some embodiments performs processing on the watermarked content segments produced by the watermarking module 206 to put the watermarked content segments in a format suitable for being distributed (as shown using arrow 222) to one or more content stores corresponding to one or more regional headends, e.g., headends 110 through 114.

Figure 3:
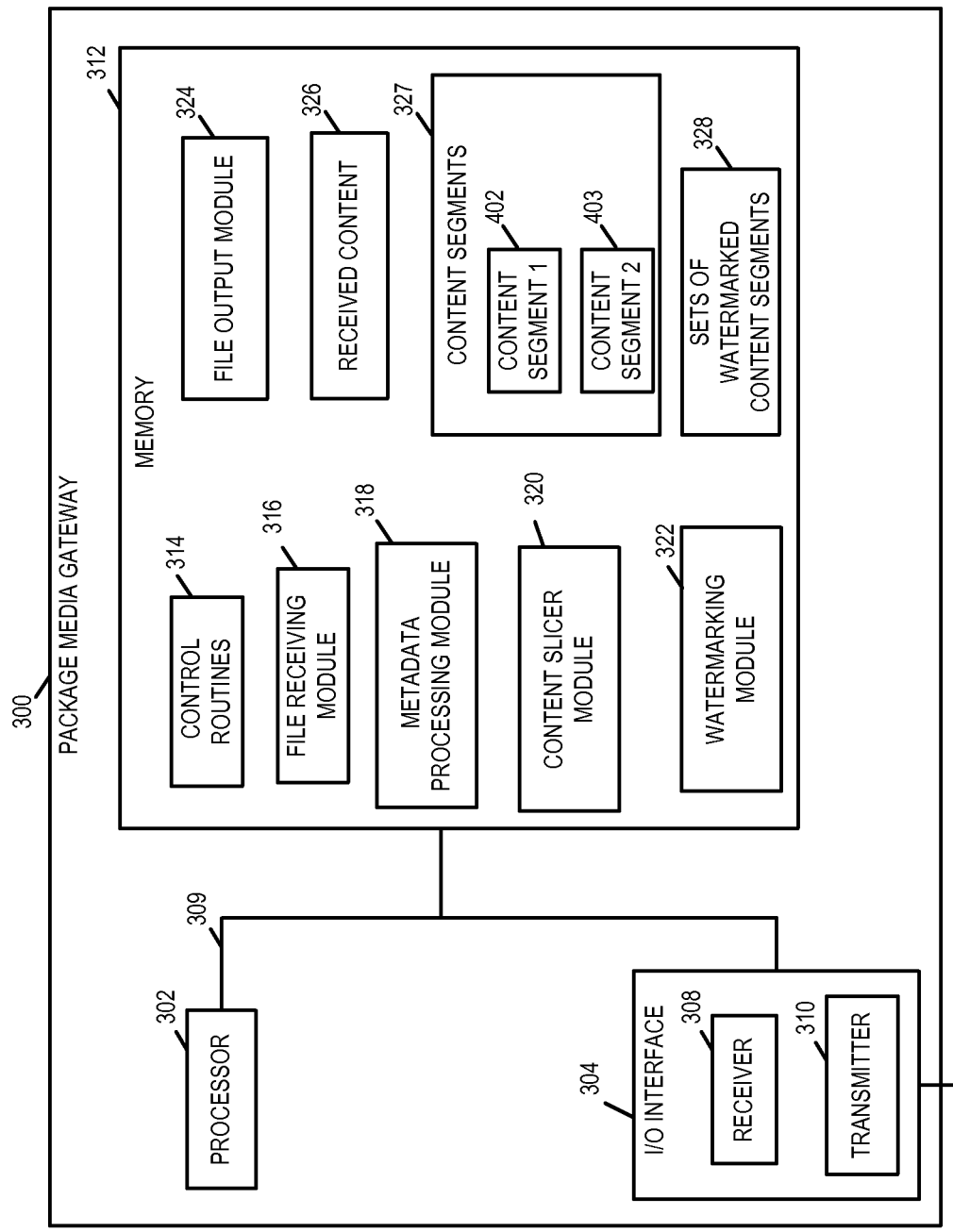
FIG. 3 illustrates an exemplary package media gateway implemented in accordance with one embodiment of the invention.

FIG. 3 illustrates an exemplary package media gateway (PMG) 300 implemented in accordance with one embodiment of the invention. The exemplary PMG 300 can be used as the PMG 108 or 200 illustrated in FIGS. 1 and 2. As illustrated, the PMG 300 includes a processor 302, an I/O interface 304 including a receiver 308 and a transmitter 310, and a memory 312 coupled together by a bus 309. Via the I/O interface 304 the PMG 300 can receive and/or send information including, e.g., content, information, signals etc. The I/O interface 304 includes the receiver 308 which is responsible for receiving and processing content, e.g., content corresponding to a movie and/or some other program content. The transmitter module 310 is responsible for outputting watermarked content segments for distribution to one or more regional headends, generating and sending signals and/or other information. Both the receiver 308 and transmitter 310 may work under direction of the processor 302 which executes one or more of the routines and/or modules included in memory 312. Received content 326 is the content received from at least one content supplier. In some embodiments the received content 326 includes some content which is to be watermarked and other content which does not have to be watermarked.

The memory 312 includes application server control routines 314 which control overall operations of the PMG 300 in accordance with the invention. Control routines 314 may operate in conjunction with various modules which are used to perform various functions. Modules included in the memory 312 include a file receiving module 316, a metadata processing module 318, a content slicer module 320, a watermarking module 322, a file output module 324, stored received content 326 and sets of watermarked content segments 328.

In accordance with one aspect of some embodiments the file receiving module 316 receives content through the I/O interface 304 and puts the received content in a format suitable for further processing to be performed on the received content by one or more other modules in accordance with the invention. For example in some embodiments the file receiving module 316 processes the received content 326 and separately identifies content which is to be watermarked and the content which is not to be watermarked.

The content slicer module 320 performs the operations discussed with regard to content slicer module 204 in the FIG. 2 example. The content segments are then fed individually to the watermarking module 322 which generates sets of watermarked versions of each individual content segment. The watermarking module 322 performs the operations discussed with regard to module 206 in the FIG. 2 example. The generated sets 328 of watermarked versions of content segments is an output of the watermarking module 322. Metadata processing module 318 performs the operations discussed earlier with regard to module 208 while the file output module 324 performs the operations discussed earlier with regard to module 212.

FIG. 4 illustrates an example 400 showing watermarking operation performed on an individual content segment 1 402 corresponding to some content received by the PMG 200, in accordance with one embodiment of the invention. It should be appreciated that a single content segment is shown in the example for discussion purposes, in the process, the watermarking operation is performed on each of the individual content segments. In the example illustrated in FIG. 4, content segment 1 402 is watermarked with different hexadecimal numbers from 0 to F.

As illustrated the digital content segment 1 402 is subjected to a watermarking operation, e.g., performed by the watermarking module 206. In the watermarking operation the individual content segment 1 402 is copied, e.g., 16 times, to generate 16 versions 404 through 420 of the content segment 1 402. Further in the process each individual copy 404 through 420 is differently watermarked as shown. For example, content segment 1 copy 404 is watermarked with number "0", content segment copy 1 405 is watermarked with number "1", content segment copy 1 406 is watermarked with number "2", content segment 1 copy 407 is watermarked with number "3", . . . , content segment 1 copy 420 is watermarked with number "F" (hexadecimal). Finally a set 422 of 16 watermarked versions of the content segment 1 402 is formed as shown. The set 422 of differently watermarked versions of the content segment 1 402 is supplied from the PMG 200 to a regional headend, e.g., headend 110.

Figure 5:
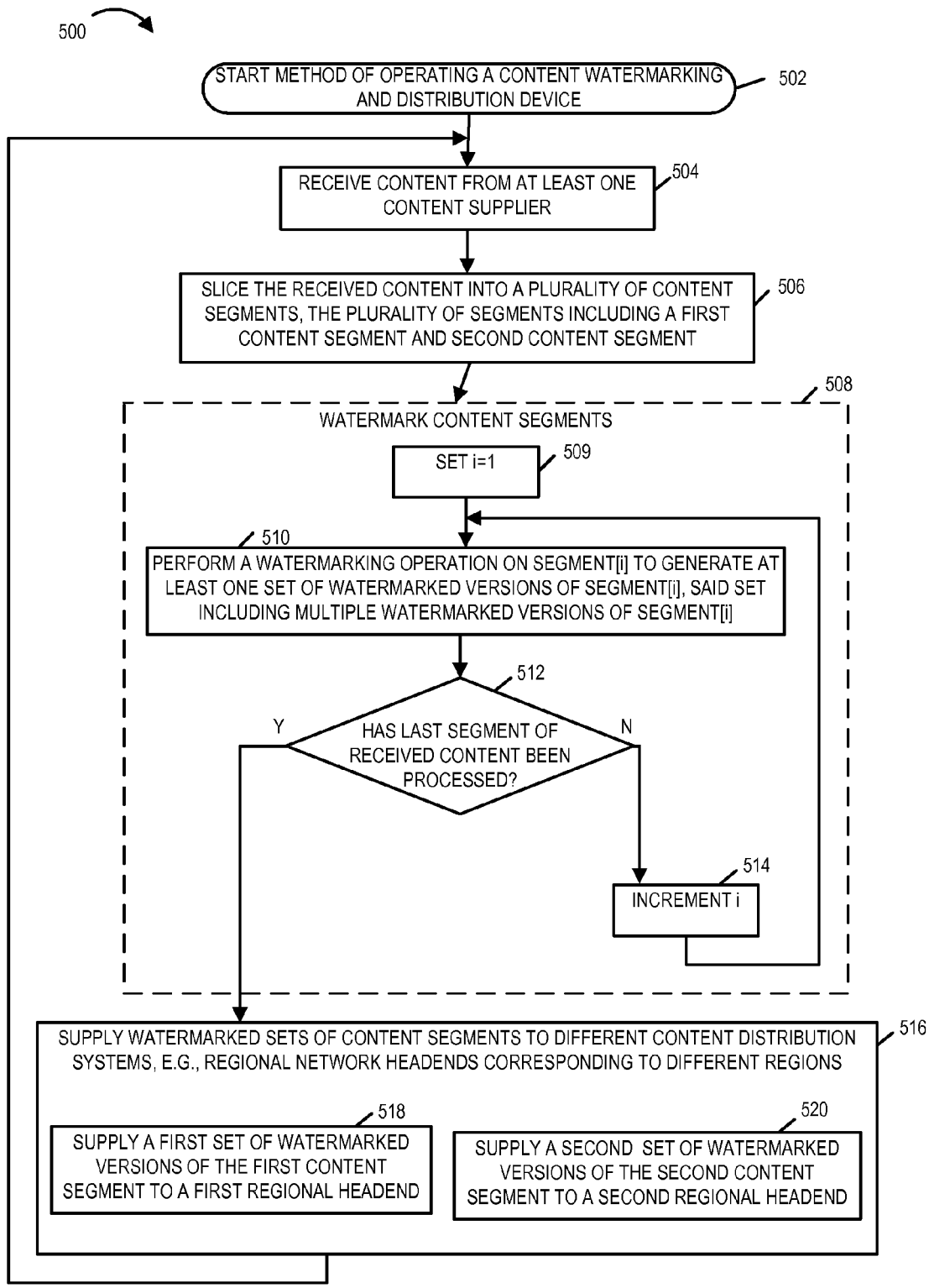
FIG. 5 illustrates a flowchart of an exemplary method of operating a content watermarking and distribution device, in accordance with an exemplary embodiment.

FIG. 5 illustrates a flowchart 500 of an exemplary method of operating a content watermarking and distribution device, in accordance with an exemplary embodiment. The content watermarking and distribution device implementing the method of flowchart 500 is, e.g., a packet media gateway (PMG) device such as PMG 108 of system 200 of FIG. 2. For the purpose of discussion, consider that the method of flowchart 500 is implemented by the PMG 108.

The method of flowchart 500 shown in FIG. 5 starts in step 502, with the content watermarking and distribution device, e.g., PMG 108, being powered on and initialized. Operation proceeds from start step 502 to step 504. In step 504 the PMG device 108 receives content from at least one content supplier, e.g., which supply video content for distribution. It should be appreciated that the PMG device 108 may, and in many embodiments does, receive content from a plurality of content suppliers.

Operation proceeds from step 504 to step 506. In step 506 the PMG device 108 slices the received content into a plurality of segments, said plurality of segments including a first segment, e.g., content segment 1 402, and a second content segment, e.g., segment 2 403.

Operation proceeds from step 506 to step 508. In step 508, the PMG device 108 initiates a watermarking operation to watermark the content segments. As part of step 508, steps 509 through 516 are performed in some embodiments. In step 509, a counter is initialized and a counter value "i" is set to 1, where "i" is a positive integer. The value "i" is used to identify a segment which is being processed at a given time. The operation proceeds to sub step 510 wherein a watermarking operation is performed individually on each of the sliced content segments corresponding to the received content which are to be watermarked, e.g., watermarking operation is performed on content segment[i] to generate at least one set of watermarked versions of segment[i], said set including multiple watermarked versions of segment[i]. In some embodiments the PMG 108 separately receives information regarding which content from of the received content is to be watermarked and which content is not to be watermarked.

Thus in the first iteration (i=1), a watermarking operation is performed on content segment 1 (i=1) to generate at least one set, e.g., a first set 422 corresponding to segment 1, of watermarked versions of the content segment 1 402, the first set including multiple watermarked versions of content segment 1 402. To facilitate better understanding of the watermarking operation performed on content segments to generate sets of watermarked versions of the content segments, reference to FIG. 4 example is made.

Operation proceeds from step 510 to step 512. In step 512 it is determined whether or not the last segment of the received content has been processed, i.e., has undergone the watermarking operation. This is done to ensure that each individual segment of the received content goes through the watermarking process to generate a corresponding set of watermarked versions of the content segment. If in step 512 it is determined that one or more individual segments of the content have not undergone the watermarking process, the operation proceeds to step 514. In step 514, the control value "i" is incremented, e.g., by 1, and the operation proceeds from step 514 back to step 510. It should be appreciated that in doing so, the operation is controlled to proceed to perform watermarking operation on the next content segment. For example, in step 514, "i" is incremented so that the control value changes to i=2. Thus in the second iteration being performed in step 510, the watermarking operation is performed on content segment [i=2], i.e., content segment 2, to generate a second set of watermarked versions of content segment 2. The operation continues in this manner until each of the content segments of the received content are processed, with a determination being made in step 512 in every iteration to check if the last segment has been processed. Thus, following the watermarking operation on the last content segment of the received content, e.g., at the end of the $N^{th}$ iteration in an example where the received content is sliced into N content segments, the result of the determination made in step 512 shows that the last segment has been processed, and the operation proceeds from step 512 to step 516.

In step 516, the PMG device 108 supplies watermarked sets of content segments, including first set 422, to different content distribution systems, e.g., regional network headends corresponding to different regions. An individual watermarked set of a content segment may include a plurality of sets of watermarked versions of the content segment. Furthermore a plurality of such sets of watermarked content segments may be provided to one or more network headends. For example, watermarked sets of content being supplied to a regional network headend, e.g., headend 1 110, may include a set of watermarked versions of content segment 1 such as set 422, a set of watermarked versions of content segment 2, . . . , a set of watermarked versions of content segment K. In some embodiments step 518 includes performing steps 518 and 520. In step 518 a first set of watermarked versions of the first content segment 1 402 is supplied to a first regional headend while in step 520 a second set of watermarked versions of the second content segment 403 is supplied to a second regional headend. Operation proceeds from step 516 back to step 504 and continues in the similar manner for additional received content.

Figure 6:
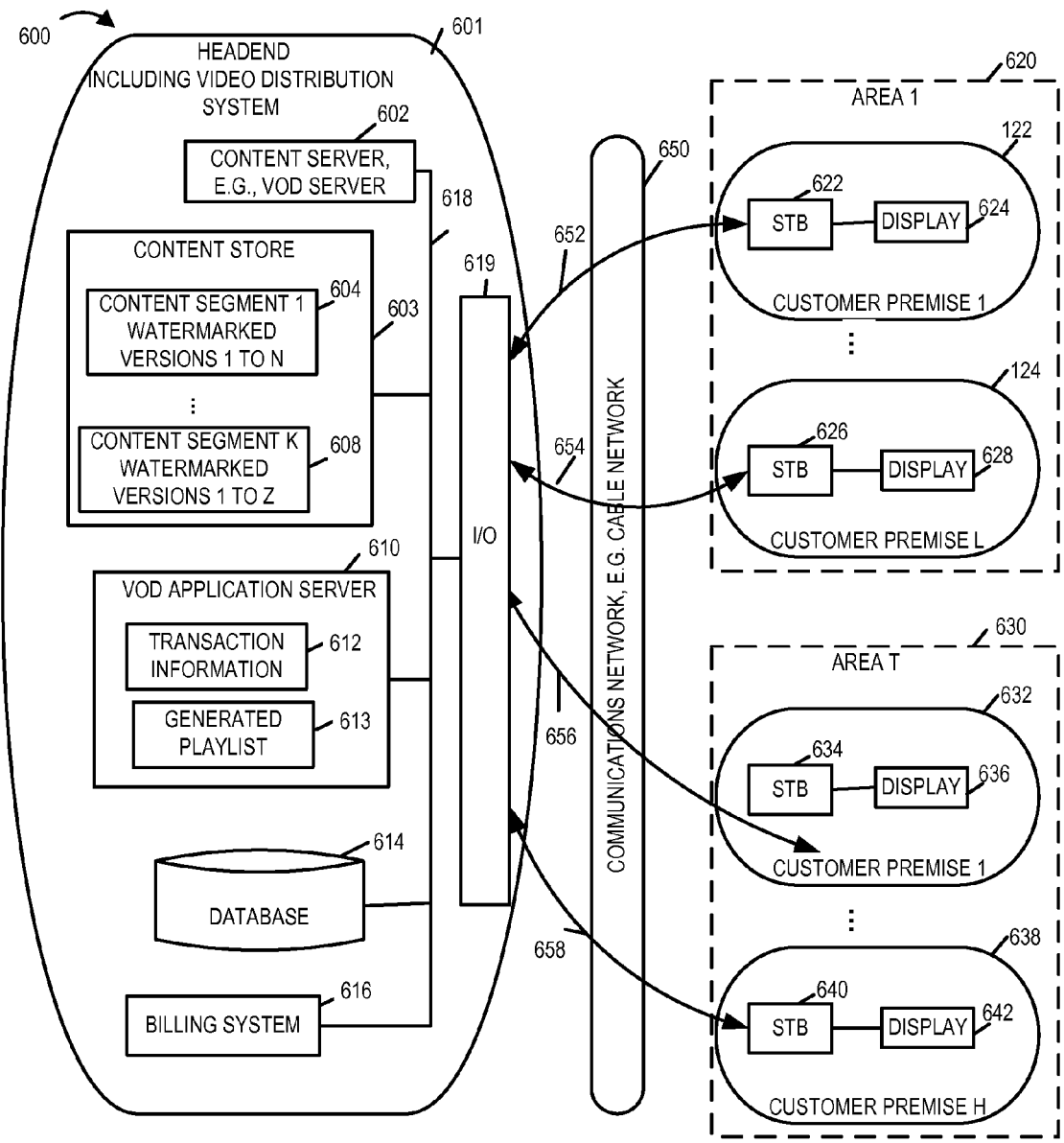
FIG. 6 illustrates an exemplary content delivery and distribution system implemented in accordance with one embodiment of the invention.

FIG. 6 illustrates an exemplary content delivery and distribution system 600 implemented in accordance with the invention. The system 600 supports the provisioning of content delivery services, as well as user content selection, notification of content availability, communication of selected sequence of watermarked content to a user device, and billing for content provided to customers in accordance with various embodiments of the present invention. Exemplary system 600 includes at least one regional service provider system, e.g., headend 601. The headend 601 can be implemented as the region 1 headend 110 of FIG. 1. The exemplary headend 601 corresponds to a first region, i.e., Region 1. A regional headend such as headend 601 provides services, e.g., content delivery services, via communications network 650, to a corresponding set of customer premises 122 through 124 and 632 through 638 which correspond to the region serviced by the particular headed 601. Customer premises 122 through 124 correspond to area 1 620 within region 1 while customer premises 632 through 638 correspond to area T 630 within region 1.

Each customer premise in a region may include one or more set top boxes in combination with a display device and/or one or more other types of content playback devices. For example, customer premise 1 122 includes a first set of equipment, e.g. user 1 set top box (STB) 622 in combination with display 624. STB 622 is shown coupled to display 624, which may and in some embodiments is, a television set to which the STB 622 is coupled. However, it should be appreciated that the STB devices can be integrated in a device which also includes the display 624. Similarly customer premise L includes a STB 626 coupled to a display device 628. The customer premise devices such as STBs 622, 626 are coupled to the headend 601 via the communications network 650. The STB devices shown in the example, e.g., STBs 622, 626, 634, . . . , 640 may, and often do, include Digital Video Recorder (DVR) functionality and storage for storing user requested content.

Region 1 headend 601 includes a content server, e.g., video on-demand (VOD) server 602, a content store 603, a VOD application server 610, a database of information 614, and a billing system 616. The database 614 includes a variety of information including customer account information, e.g., customer name, address, STB identification information, watermarked content related information, etc. The billing system 616 includes a billing management server and customer billing information database.

In some embodiments the content server 602 includes a broadcast file server (BFS) and a video on-demand (VOD) server. For the purpose of discussion the server 602 will be referred to as the VOD server. The VOD server 602 provides content to one or more customer premises devices either in response to an on-demand request for content received via network 650 from one or more customer premises shown in FIG. 6, or as part of a content broadcast by server 602. As should be appreciated, a single content server 602 is shown providing both broadcast and VOD content but in many systems and embodiments this is done through the use of two servers each of which may have access to content store 603.

The various servers 602, 610, 616 in the network headend 601 are coupled together via a bus 618 over which they may interchange data and information. The bus 618 is coupled via a network input/output interface to communications network 650. Via the bus 618 and input/output interface 619 the devices in the headend can supply content to the for delivery to various customer premise devices including STBs 622, 626, 634, and 640 and receive content from the customer premise devices. I/O interface 619 includes a receiver circuit or module and a transmitter circuit or module allowing it to support bi-directional communication.

The communications network 650 can be, and in some embodiments is, implemented as a cable network. Communications links 652, 654, 656, 658 traversing the service provider's cable network 650 couples set top boxes 622, 626, 634, and 640 to the region 1 headend's bus 618.

In various embodiments the headend 601 includes an interface for receiving content including sets of watermarked content segments, e.g., from the PMG 200. In some embodiments, the interface receives N watermarked versions of a first content segment 604, each of the N watermarked versions of the first content segment including a different watermark, N being a positive integer greater than 1, and receives M watermarked versions of a second content segment 606, each of the M watermarked versions of the second content segment including a different watermark, M being a positive integer greater than 1.

The content store 603 includes content received from the package media gateway 200. The received content includes regular content, e.g., non watermarked content, as well as watermarked content segments corresponding to some other content. The content store 603 includes a plurality of sets of watermarked versions of content segments received from the PMG 200. The plurality of sets include content segment 1 watermarked versions 1 to N 604, . . . , content segment K watermarked versions 1 to Z 608. The delivery of video and/or other content may, and normally is through VOD server 602, that may output the content in a suitable format that can be delivered over the communications network 650 to one or more set top boxes. In accordance with one aspect of the invention, in various embodiments the VOD sever 602 outputs a sequence of watermarked content segments, e.g., corresponding to Video on Demand content, in response to a request for content. It should be appreciated that for N=16, the set 604 of content segment 1 watermarked versions 1 to N is the similar to set 422 illustrated in the example of FIG. 4.

The VOD application server 610 interacts with the customer premise devices, e.g., STBs 622, 626 and processes requests for content received from one or more STB devices corresponding to one or more customers. The VOD application server 610 is responsible for generating a playlist 613 defining a sequence of watermarked content segments to be supplied to one or more customers in response to a request for content from said one or more customers. In accordance with one feature of various embodiments the playlist 613 defines which watermarked content segments (included in the content store 603) that the VOD server 602 should stream out to a customer who requested content, e.g., VOD content, by sending a request for content 1022 discussed later with regard to FIG. 10. Following the generation of the playlist 613, the VOD application server 610 passes the playlist 613 off to the VOD server 602.

The VOD application server 610 generates transaction information 612 which includes session identification information, e.g., session ID, corresponding to a session during which VOD content is supplied to a customer. The transaction information 612 further includes information regarding the supplied watermarked content segments corresponding to the VOD content being supplied. The transaction information may be generated on a per session basis. The transaction information is then stored in the database 614 over time to build up information regarding descriptions that correlate to the content, e.g., watermark/session correlation data. Operations performed by the VOD application server 610 are discussed in greater detail with regard to FIGS. 10 and 11.

Billing system 616 generates and processes billing information corresponding to region 1 customers, e.g., updating billing charge information in response to video on demand purchases, upgrades, and/or other activity. Billing system 616 also processes bill payment information, e.g., credit card transactions, deductions from debit accounts, mail bills, and/or processes discount and/or coupon information.

Figure 7:
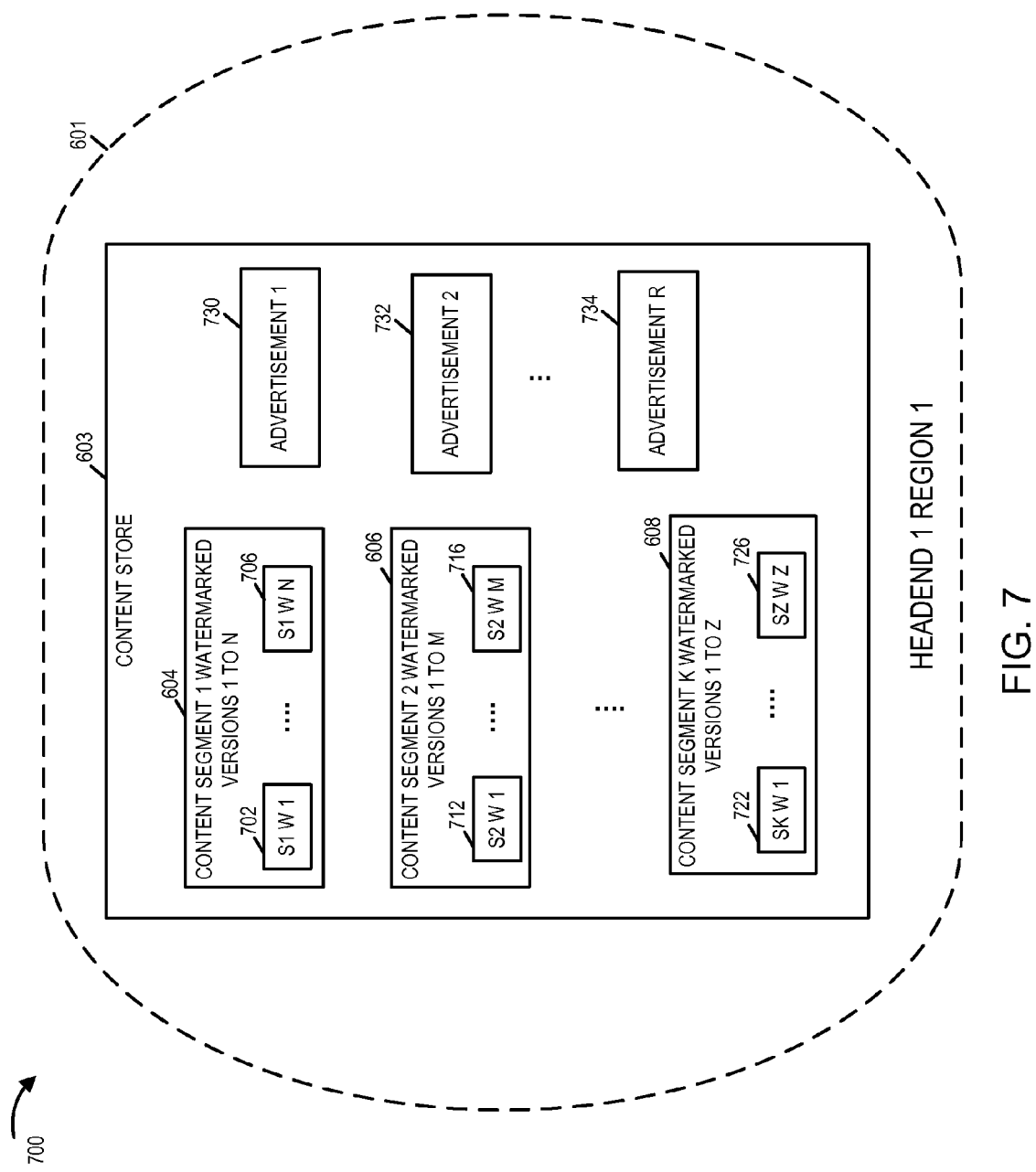
FIG. 7 illustrates a portion of the exemplary headend of FIG. 6 in greater detail.

FIG. 7 illustrates an example 700 showing a part of the exemplary headend 601 in greater detail. In the example 700, the content store located at the headend 601 is illustrated in a more detailed manner. As shown, the content store 603 includes a plurality of sets of watermarked versions of content segments, e.g., one or more sets such as the set 422 illustrated in FIG. 4. The content store 603 includes content segment 1 watermarked versions 1 to N 604, content segment 2 watermarked versions 1 to M 606, . . . , content segment K watermarked versions 1 to Z 608. In various embodiments N, M, K, and Z are positive integers.

As should be appreciated from FIG. 7, the set 604 includes N watermarked versions of content segment 1 including S1 W1 702 (segment 1 with first watermark) through S1 W N 706 (segment 1 with a $N^{th}$ watermark) each content segment version having a different watermark. Similarly the set 606 includes M watermarked versions of content segment 2 including S2 W1 712 through S2 W M 716, while the set 608 includes Z watermarked versions of content segment K including SK W1 722 through SK W Z 726, each content segment version in a given set having a different watermark.

The content store further includes one or more advertisements, e.g., advertisement 1 730, advertisement 2 732, . . . , advertisement R 734. In accordance with one aspect of some embodiments of the invention, the headend 601 uses watermarked versions of content segments corresponding to a plurality of content segments to generate a sequence of watermarked content segments for supplying to one or more customers. In some embodiments the sequence of watermarked content segments is generated by interlacing advertisements with watermarked versions of content segments corresponding to different sets of content segments. The advertisements may or may not be watermarked depending on embodiment. When advertising and/or other segments introduced into the main program are not watermarked they may be disregarded for purposes of determining a sequence of numbers communicated by the sequential watermarked segments of the program.

Figure 8B:
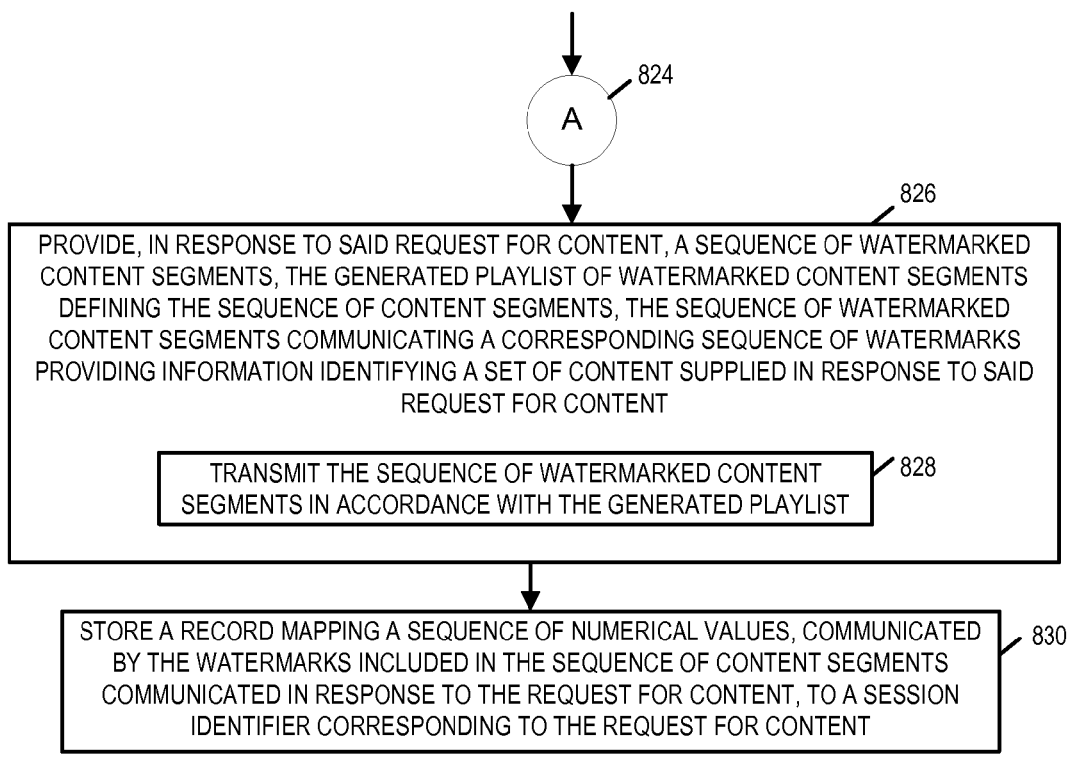
FIG. 8 illustrates a flowchart of an exemplary content distribution method, in accordance with an exemplary embodiment of the invention.

FIG. 8 illustrates a flowchart 800 of an exemplary content distribution method, in accordance with an exemplary embodiment of the invention. The exemplary method of flowchart 800 can be implemented by a content distribution system such as a network headend. For the purpose of discussion, consider that the method of flowchart 800 is implemented by regional network headend 601 shown in FIG. 6.

The method of flowchart 800 shown in FIG. 8 starts in step 802, with the headend being initialized. Operation proceeds from start step 802 to steps 804, 806, 808, 810 and 811 which are performed asynchronously in some embodiments and may be performed at different points in time.

In steps 804 through 808 it is illustrated that the headend 601 receives one or more sets of watermarked versions of content segments from the package media gateway 200 in accordance with one feature of the invention. In step 804 the headend 601 receives a first set 604 of N watermarked versions of a first content segment, each of the N watermarked versions of the first content segment including a different watermark. To facilitate understanding, an exemplary set 422 of 16 watermarked versions of a first content segment 404 is illustrated in FIG. 4. In step 806 the headend 601 receives a second set 606 of M watermarked versions of a second content segment, each of the M watermarked versions of the second content segment including a different watermark. In various embodiments the first and second content segments correspond to a movie or television program. As should be appreciated, while two segments are described for purposes of explaining the invention, the movie or program in many cases would include many segments, e.g., hundreds or even thousands depending on the segment size and duration of the movie or program.

Continuing in the same manner, in some embodiments the headend 601 receives a plurality of sets of watermarked versions of content segments, and as illustrated in step 808 the headend 601 receives a set 608, e.g., a $K^{th}$ set of Z watermarked versions of a $K^{th}$ content segment, each of the Z watermarked versions of the $K^{th}$ content segment including a different watermark. In various embodiments N, M, K, and Z are positive integers.

In step 810, which occurs in parallel and independent of steps 804 through 808, the headend 601 receives a request for content, e.g., from a set top box of a customer at a customer premise, e.g., such as STB 622. The request for content in some embodiments is a request for video on-demand content that the customer may wish to watch. In step 811, the headend 601 determines an identifier to be communicated by a sequence of watermarked content segments. In accordance with one aspect the identifier is determined as a function of on one or more different factors, e.g., such as time, geographic region to which a sequence watermarked content segments is being provided, a set top box identifier, a user/customer identifier, a session identifier corresponding to a communications session in which the sequence watermarked content segments is being provided. The identifier is then used in performing step 812 discussed below and as can be appreciated from the figure, the determined identifier is an input to sub-step 816 which is performed as part of the step 812.

Operation proceeds from steps 804, 806, 808, 810 and 811 to step 812. In step 812, the headend 601 starts an operation to generate a playlist of watermarked content segments, e.g., such as generated playlist 613. In some embodiments the playlist is generated by the VOD application server 610 in the headend 601 and the generated playlist is transferred to the VOD server 602. In various embodiments the generated playlist defines a sequence of content segments to be provided to a customer in response to the request for content received in step 810. As part of step 812, steps 814 through 822 are performed in some embodiments. In step 814, a counter is initialized and a counter value "i" is set to 1, where "i" is a positive integer. The value "i" is used to identify a corresponding content segment in a received set of watermarked content segments at a given time. Following initialization of "i" in step 814 the operation proceeds to step 816. In step 816 a watermarked content segment[i] is selected from a corresponding set[i] of differently watermarked versions of content segment[i]. In various embodiments the selection of a particular watermarked content segment from a set including a plurality of differently watermarked versions of an individual content segment is made based on the determined identifier (step 811) which is an input to the selection step 816. In some embodiments the identifier is determined as a function of a time, and thus in some such embodiments the selection of at least one watermarked segment from the corresponding set of differently watermarked versions of an individual segment is made as a function of a time.

For example consider a plurality of sets of watermarked content segments such as sets 604 through 608 shown in FIG. 7 which are received by the headend 601. In the first iteration i=1, in the selection step 816 a watermarked content segment is selected from N watermarked versions of content segment 1 within the first set 604. The numerical value of the identifier determined in step 811 controls which watermarked segment, out of the N watermarked versions of content segment 1, is selected from the first set 604. In this way the watermarked segment communicating the intended numerical value will be selected and output. Thus it should be appreciated that in various embodiments the selection of one or more watermarked content segments to be included in a playlist defining the sequence of watermarked content segments to be provided in response to the request for content, is made as a function of the numerical value of the identifier discussed in step 811.

Operation proceeds from step 816 to step 818 wherein the selected segment[i] is included in the playlist being generated, the playlist defining the sequence of watermarked content segments to be provided in response to the request for content. In some embodiments the sequence of watermarked content segments communicates a plurality of at least X watermarked segments, X being a positive integer greater than 7. In some embodiments selection of at least one watermarked segment from said corresponding set of differently watermarked versions of the individual segment is made as a function of a geographic region to which said sequence of content segments is being provided, e.g., geographic region where the customer sending the request for content is located. In some embodiments selection of at least one watermarked segment from said corresponding set of differently watermarked versions of said individual segment is made as a function of an identifier corresponding to a set top box or user to which the request for content corresponds. In some embodiments selection of at least one watermarked segment from said corresponding set of differently watermarked versions of said individual segment is made as a function of a session identifier corresponding to a communications session in which the sequence of content segments is communicated, e.g., to the STB device that sent the request for content. In one embodiment selection of at least one watermarked segment from a corresponding set of differently watermarked versions of the individual segment is made as a function of at least one of: i) time ii) a geographic region to which the sequence of content segments is being provided, iii) an identifier corresponding to a set top box or user to which the request for content corresponds, iv) a session identifier corresponding to a communications session in which said sequence of content segments is communicated, or v) an identifier corresponding to a regional server, e.g., such as headend 601, distributing the sequence of content segments.

The operation proceeds from step 818 to step 820. In step 820 the counter value "i" is incremented, e.g., by 1, and the operation proceeds from step 820 to step 822. It should be appreciated that by incrementing "i", the operation is controlled to proceed to select next watermarked content segment from the next set of received content segments. In step 822, a comparison is made between the current value of "i" and K which is the total number of content segments received by the headend 601 corresponding to a given content, to determine if the current value of i exceeds K. In the example of FIG. 8, sets corresponding to a total of K segments are received by the headend. Thus in step 822 it is determined if i>K. If it is determined that i does not exceed K, the operation proceeds from step 822 back to step 816 and the headend continues to select the next watermarked content segment from the next set of received content segments, i.e., a watermarked content segment 2 (i=2) is selected from M watermarked versions of content segment 2 within the second set 606. Again the value of identifier determined in step 811 may, and in some embodiments does, control which watermarked segment out of the M watermarked versions of content segment 2 from the second set 606 is selected in the second iteration. The operation continues in this manner until a watermarked content segment is selected from each of the received sets of watermarked content segments, to be included in the playlist being generated. In the FIG. 8 example, the operation continues in this manner till the end of $K^{th}$ iteration. Accordingly, in this manner a playlist of sequence of selected watermarked segments is generated.

If in step 822 it is determined that the current value of i exceeds K, the operation proceeds from step 822 to step 826 via connecting node A 824. In step 826, the VOD server 602 at headend 601 provides, in response to the received request for content, a sequence of watermarked content segments, e.g., to customer STB 622 that sent the request, in accordance with the generated playlist of watermarked content segments. The generated playlist of watermarked content segments defines the sequence of content segments to be provided, e.g., streamed to the customer, the sequence of watermarked content segments communicates a corresponding sequence of watermarks providing information identifying content supplied in response to the request for content. In various embodiments the watermarks correspond to numerical values, the sequence of content segments communicate a sequence of numerical values communicated by the watermarks included in the watermarked content segments included in the sequence of content segments. The VOD server 602 selects, for streaming, the watermarked content segments in the order they occur in the playlist.

Examination of the streamed content, or copies of the streamed content, can be preformed to receiver the communicated sequence of numerical values conveyed by the sequence of watermarked segments. If a user breaks copyright law or copy/use restrictions and distributes the content, the watermarked digits remain intact and can be used to determine, e.g., the particular session that generated the video stream, transmitting organization, time, and other identifying information of which session was recorded and illegally distributed.

In various embodiments step 828 is performed as part of the step 826 of providing the sequence of watermarked content segments. In step 828 the VOD server 602 transmits the sequence of watermarked content segments in accordance with the generated playlist. Operation proceeds from step 826 including step 828, to step 830. In step 830 the headend 601 stores, e.g., in the database 614, a record mapping a sequence of numerical values, communicated by the watermarks included in the sequence of watermarked content segments communicated in response to the request for content, to a session identifier corresponding to the request for content. In some embodiments the record is a record in a log maintained by the video server 602 which supplied the sequence of content segments in response to request for content, e.g., on-demand video content requests. It should be appreciated that the identifier discussed in step 811 is the sequence of numerical values communicated by the watermarks included in the sequence of watermarked content segments communicated.

In some embodiments the generating and transmitting steps are performed by a headend of a content distribution system which receives said N watermarked versions of the first content segment 604 and said M watermarked versions of the second content segment 606 from another network device. In some embodiments said another network device is a packet media gateway, e.g., PMG 108.

Figure 9:
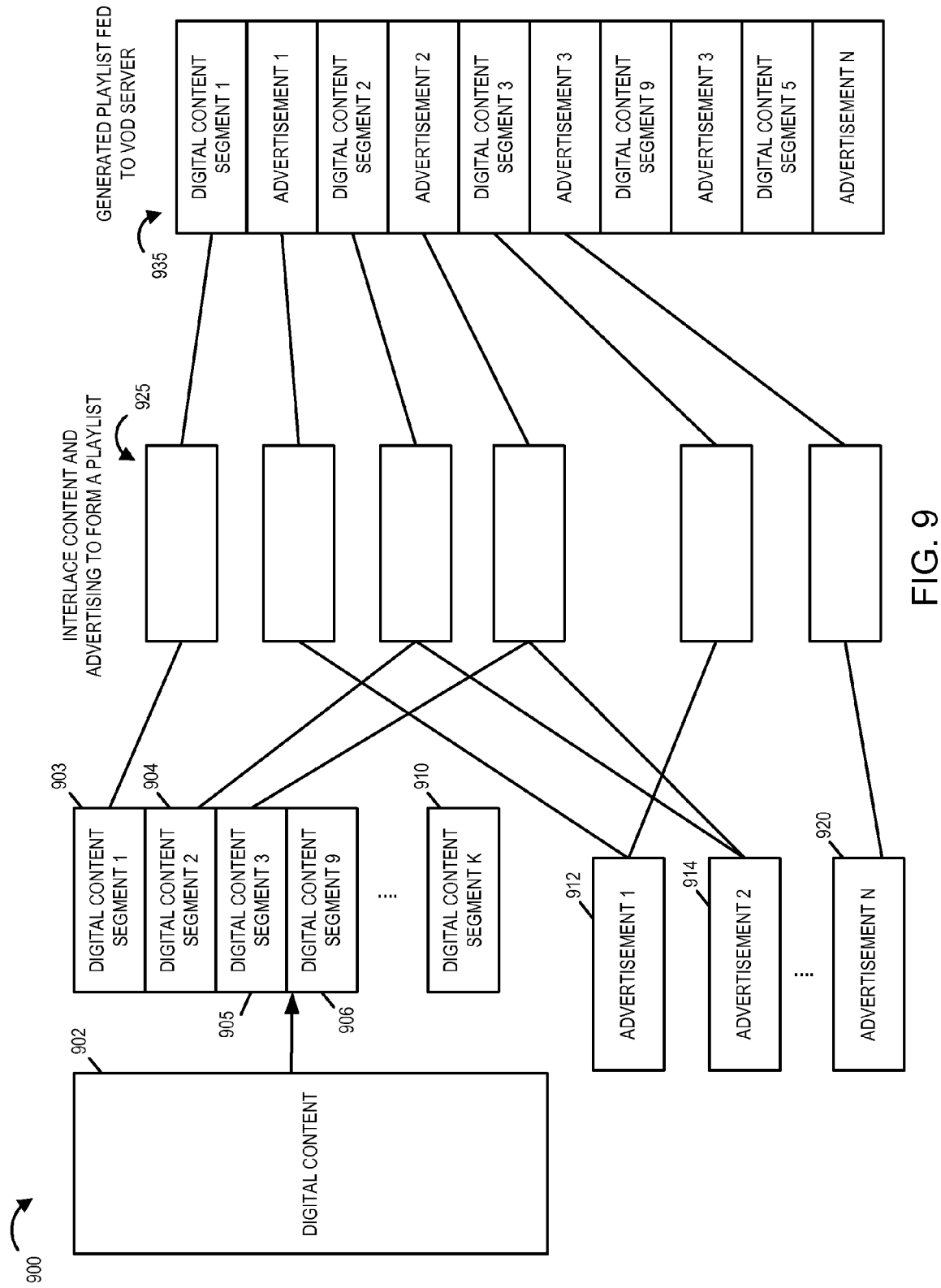
FIG. 9 is a drawing illustrating the concept of slicing content, and logically interlacing the content segments with advertising content in accordance with one embodiment of the invention.

FIG. 9 is a drawing 900 illustrating the concept of slicing content, e.g., digital content 902 received from a content supplier into sections, into a plurality of digital content segments 902 through 910, and logically interlacing the content segments with advertising content, e.g., advertisements 912 through 920, and combining into a playlist of content 935. Although not shown in FIG. 9 example, in some embodiments the sliced digital content segments are watermarked content segments. The playlist of content 935 including the content segments interlaced with advertisements is stored in the content store 603 and is fed to the VOD server 602.

Figure 10:
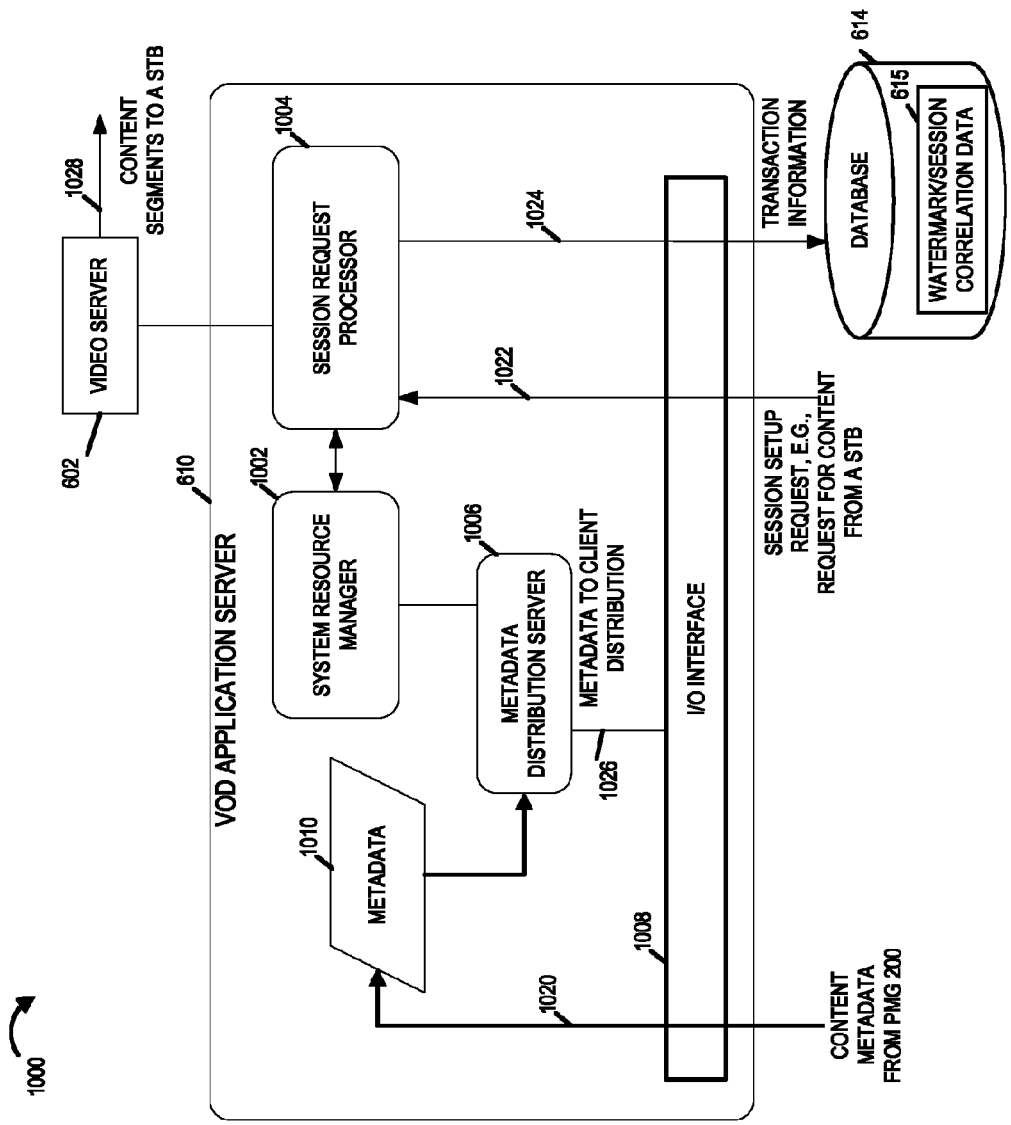
FIG. 10 illustrates a functional diagram of an exemplary application server, e.g., a video on-demand (VOD) application server, in accordance with one embodiment.

FIG. 10 illustrates a functional diagram 1000 illustrating some functions and/or operations performed by an exemplary VOD application server 610 or one or more elements of the VOD application server 610, in accordance with one embodiment. The exemplary VOD application server 610 includes a system resource manager 1002, a session request processor 1004, a metadata distribution server 1006 an I/O (input/output) interface 1008, and metadata 1010 associated with the watermarked content segments received from the packet media gateway 300. The VOD application server 610 may be coupled to the VOD server 602 as shown in the FIG. 10 example.

In the illustrated example, a session setup request 1022 may be received from a user at a customer premise, e.g., through the customer's STB device. In one embodiment the Session Request Processor 1004 generates a unique multi-digit session number and records it to an external database along with the user identification information, asset number and time stamp. Additionally, the Session Request Processor 1004 allocates system resources such as bandwidth, etc., from the System Resource Manager 1002. The VOD application server 610 also builds information including descriptions that correlate to the content, e.g., watermark/session correlation data 615, and stores the data 615 in the database 614. In various embodiments a record of the watermark along with the user account information is stored in the database 614.

In accordance with one feature of various embodiments the VOD application server 610 builds a playlist of which watermarked content segments the VOD server 602 should stream out to the customer who requested the session initiation by sending a request for content 1022. Following the generation of the playlist the VOD application server passes the playlist off to the VOD server 602. In accordance with one embodiment of the invention, the VOD server 602 is responsible for providing, in response to a request for content, a sequence of watermarked content segments including one of said N watermarked versions of the first content segment 604 and one of said M watermarked versions of the second content segment 606, the sequence of watermarked content segments communicating a corresponding sequence of watermarks providing information identifying content supplied in response to the request for content. The watermark/session correlation data 615 in some embodiments includes record mapping the sequence of numerical values communicated by the watermarks included in the sequence of watermarked content segments communicated in response to the request for content 1022, to a session identifier corresponding to the request for content.

The metadata 1010 associated with watermarked content segments which are received by the headend 601 is received by the VOD application server 610 from the PMG 200 through the I/O interface 1008 as shown using arrow 1020. The metadata distribution server 1006 distributes metadata 1010 associated with watermarked content segments to the clients (customer premise devices such as STBs) receiving the watermarked content.

Figure 11:
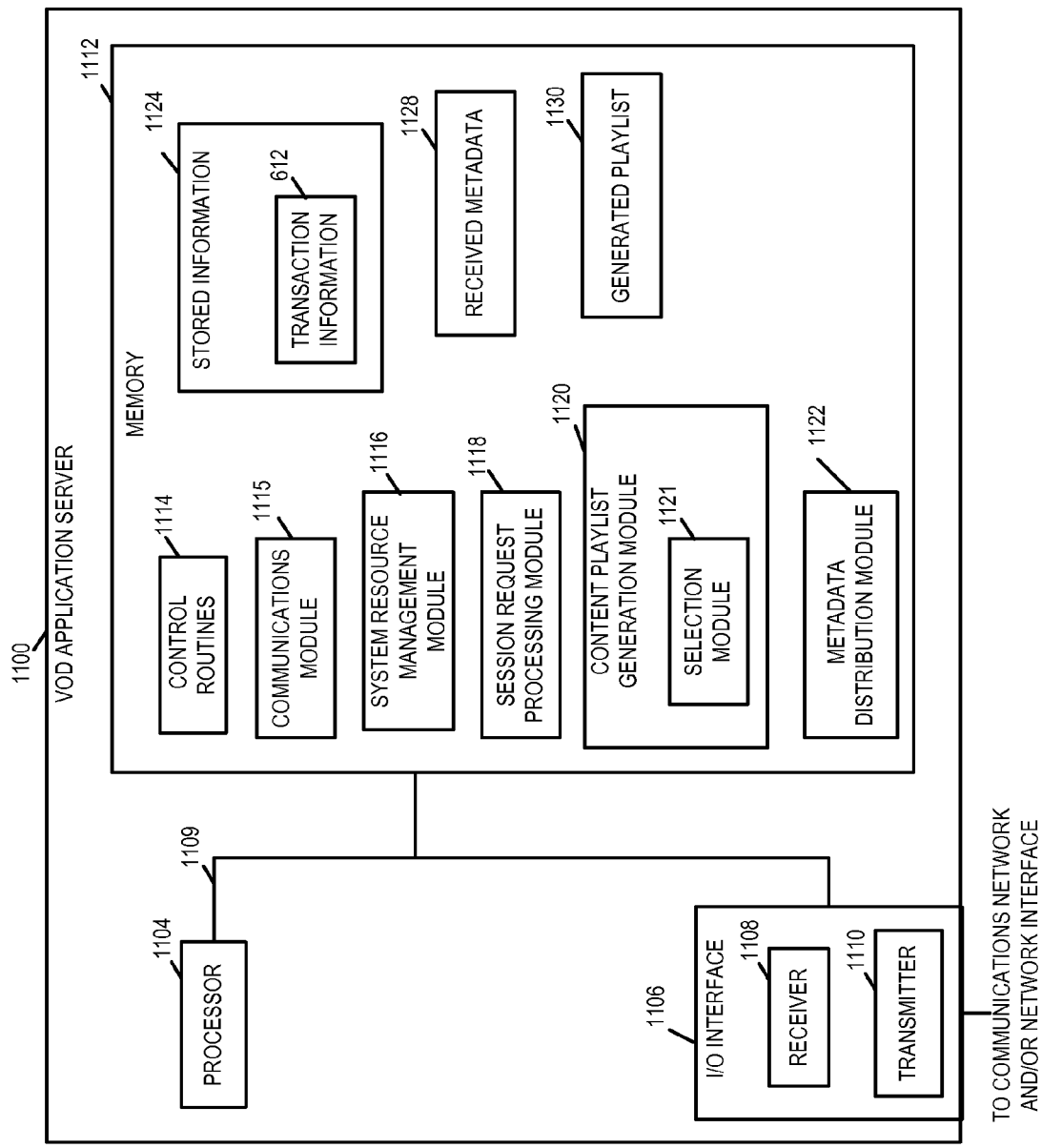
FIG. 11 illustrates an exemplary VOD application server implemented in accordance with one embodiment of the invention.

FIG. 11 illustrates an exemplary VOD application server 1100 implemented in accordance with one embodiment of the invention. The exemplary VOD application server 1100 can be used as the VOD application server 610 illustrated in FIGS. 6 and 10. As illustrated, the VOD application server 1100 includes a processor 1104, an I/O interface 1106 including a receiver 1108 and a transmitter 1110, and a memory 1112 coupled together by a bus 1109. Via the I/O interface 1106 the application server 1100 can receive and/or send information including, e.g., messages, information, commands, signals etc. The I/O interface 1106 includes the receiver 1108 which is responsible for receiving and processing information, e.g., session initiation request messages, request for content, metadata, and/or control signals. The transmitter module 1110 is responsible for generating and sending signals and/or other information. Both the receiver 1108 and transmitter 1110 may work under direction of the processor 1104 which executes one or more of the routines and/or modules included in memory 1112.

The memory 1112 includes application server control routines 1114 which control overall application server operation in accordance with the invention. Control routines 1114 may operate in conjunction with various modules which are used to perform various functions. Modules included in the memory 1112 include a communications module 1115, a system resource management module 1116, a session request processing module 1118, a playlist generation module 1120, a metadata distribution module 1122, stored information 1124, and received metadata 1128.

The communications module 1115 includes communications routines implementing the communications protocols supported by the application server 1100, to communicate with other devices. The session request processing module 1118 is responsible for processing a received session setup requests and requests for content such as request 1022, from a user at a customer premise, e.g., through the customer's STB device. In some embodiments the session request processing module 1118 generates a session number including one or more digits and records it to a database along with the user identification information, asset number and time stamp. In some embodiments the session request processing module 1118 facilitates allocation of system resources such as bandwidth, etc., by interacting with the system resource management module 1116.

The VOD application server 1100 also generates information regarding descriptions that correlate to the content, e.g., watermark/session correlation data. The information including the watermark/session correlation data may be stored in the memory 1112 or in a external database, e.g., database 614, that can be accessed by the VOD application server 1100.

The playlist generation module 1120 generates a playlist of which watermarked content segments the VOD server 602 should stream out to the customer who requested the content by sending a request for content 1022. In various embodiments the application server 1100 generates a playlist 1130 of selected watermarked content segments, said playlist of selected watermarked segments defining a sequence of content segments to be provided in response to the request for content. The playlist generation module includes a selection module 1021 which is responsible for selecting watermarked content segments to be included in the playlist in accordance with the invention. The processor 1104 in combination with the playlist generation module 1020 and selection module 1021, performs the operation discussed with regard to step 812 which includes steps 814, 816, 818, 820 and 822. In some embodiments the sequence of watermarked content segments (e.g., as defined by the generated playlist 1130) communicates a plurality of at least X watermarked segments, and the selection module 1021 is configured to select each individual one of said X watermarked segments from a set of differently watermarked versions of an individual segment being selected.

Following the generation of the playlist, the VOD application server 1100 passes the generated playlist 1130 off to the VOD server 602. The VOD server 602 then provides, e.g., transmits to the customer STB device 622 that requested content, the sequence of content segments in accordance with the playlist 1130.

Received metadata 1128 corresponds to the metadata 1010 associated with the watermarked content segments received from the packet media gateway 300 as discussed in FIG. 10. The metadata distribution module 1122 distributes metadata 1128 associated with watermarked content segments to the clients (customer premise devices such as STB 622) receiving the watermarked content.

Figure 12:
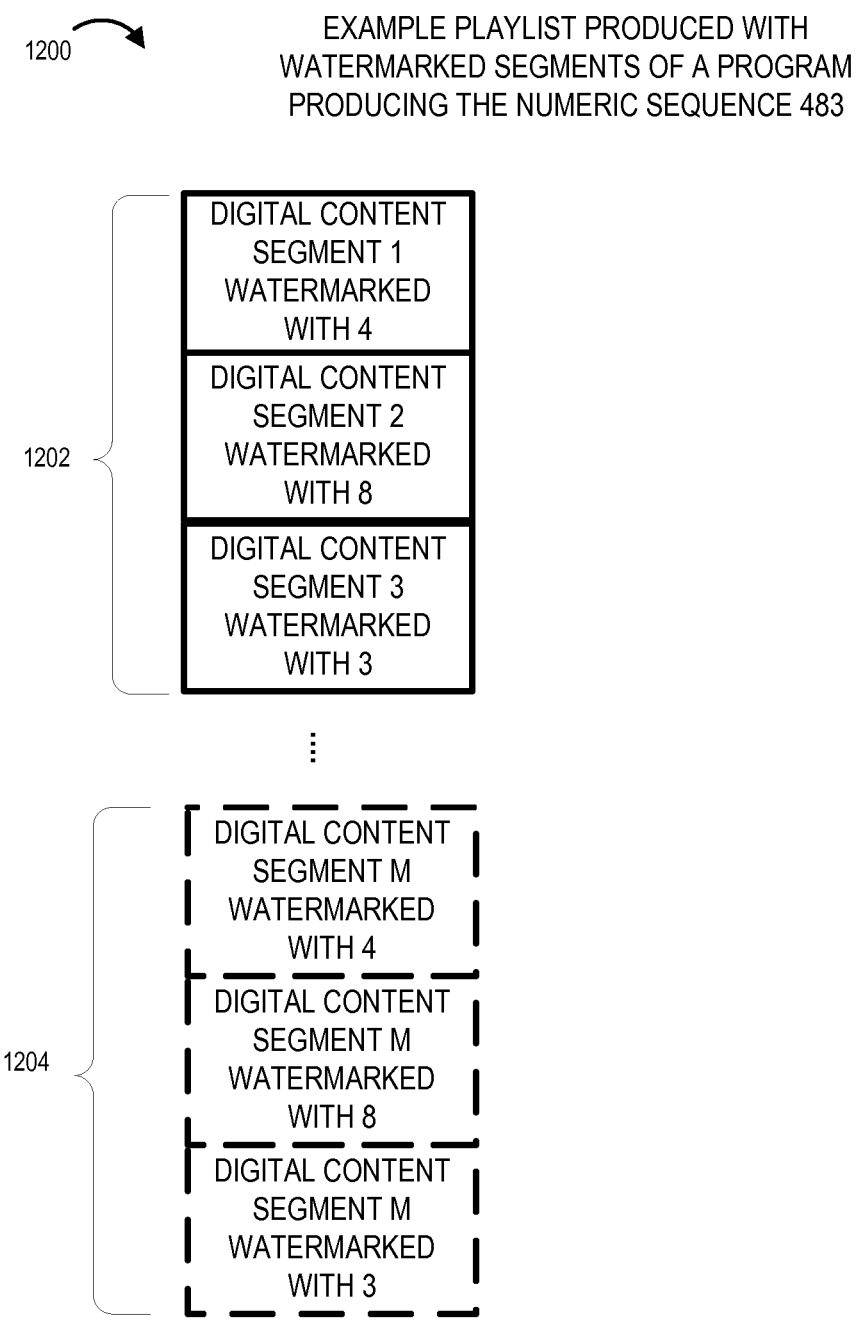
FIG. 12 illustrates an exemplary playlist of watermarked content segments generated in accordance with one embodiment of the invention.

FIG. 12 illustrates an exemplary playlist 1200 of watermarked content segments generated in accordance with one embodiment of the invention. The playlist defines a sequence of content segments with inserted watermarks that are selected based upon, e.g., the correspondence to a digit in a session identifier in one embodiment. Each digital content segment may have a plurality of copies of itself, e.g., 16 copies in some embodiments which are stored in a content store of a headend, with each copy having a different watermark. The application server 1100 (610) is responsible for selecting a correctly numbered (watermarked) content segment from the content store 603 and put it in a correct order/slot in the playlist 1200.

The playlist 1200 defines a selected sequence of watermarked content segments corresponding to some content, e.g., a movie or some other program. The steps involved in the generation of such a playlist have been discussed in detail in the flowchart 800 of FIG. 8. It should be appreciated that the playlist defines the sequence of watermarked content segments but does not include the actual content segments themselves. In various embodiments each watermarked content segment includes at least one watermark.

As shown, the exemplary playlist 1200 defines a sequence 1202 of selected watermarked content segments of content, e.g., a program, producing a numerical sequence "483". The watermarks correspond to numerical values, the sequence of watermarked content segments communicate a sequence of numerical values communicated by the watermarks included in the watermarked content segments included in the sequence of watermarked content segments. Thus in the example of FIG. 12 the playlist 1200 defines a first sequence 1202 of watermarked content segments including content segment 1 watermarked with 4, content segment 2 watermarked with 8 and content segment 3 watermarked with 3.

In some embodiments the numerical sequence communicated by the watermarks included in the watermarked content segments, such as the sequence "483" in this particular example represents the session number (e.g., session ID) in which the watermarked sequence of content segments is communicated, and/or any information that is desired. It should be appreciated that the session ID is only an example and other types of information desired may be used such as the ID of the organization/content provider streaming the content, the geographic area the content is streamed to, a time stamp of when the was streamed etc.

Figure 13:
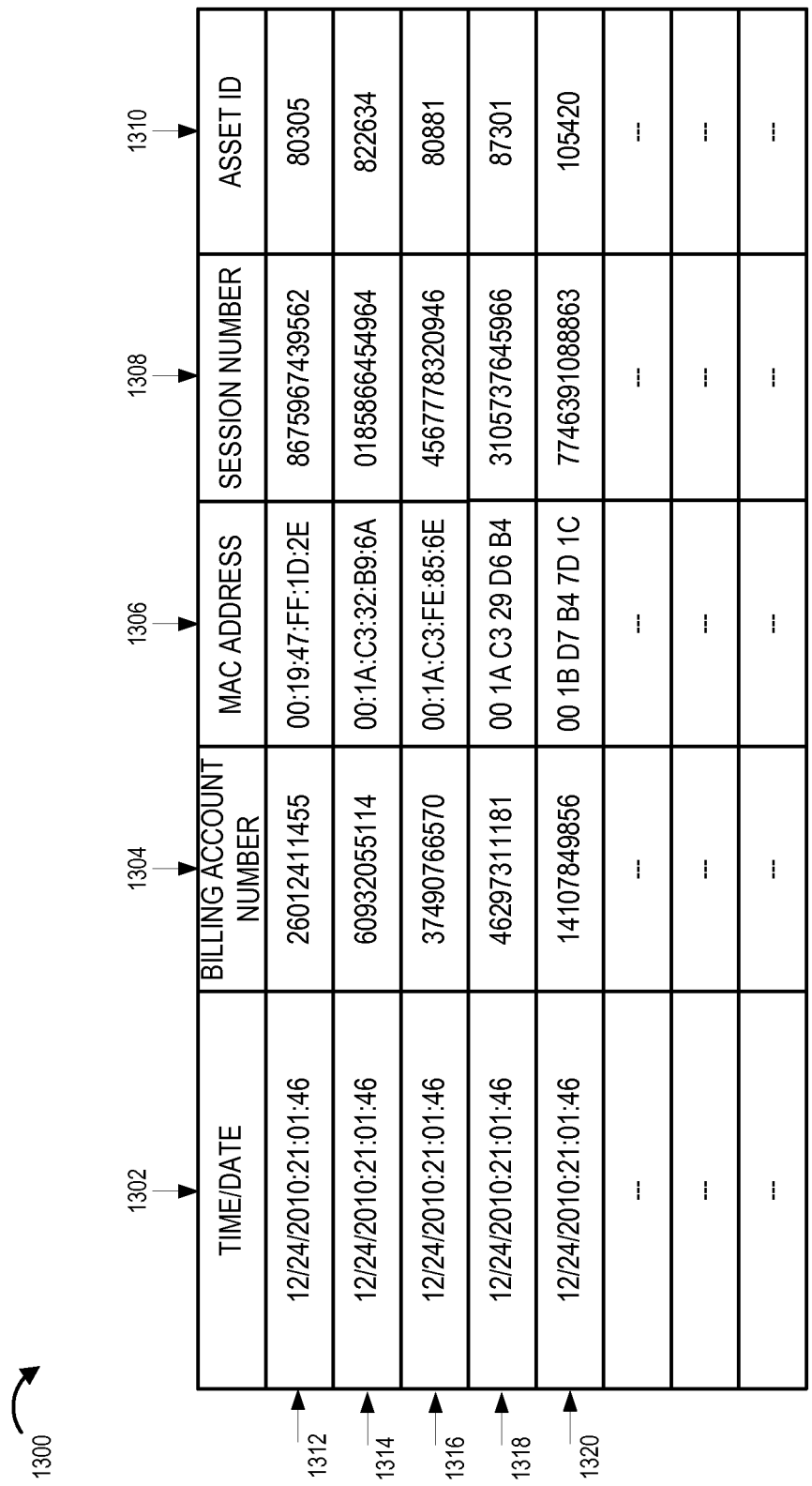
FIG. 13 illustrates an exemplary table including information regarding the timing of content streaming to customers and information associated with the customers to whom the content is streamed.

FIG. 13 illustrates an exemplary table 1300 including information regarding the time when content is streamed to, e.g., a plurality of customers, and information associated with the customers to whom the content is streamed, e.g., customer account and/or device information.

Each entry in column 1302 of table 1300 identifies date and time when some particular content is streamed to a customer corresponding to a billing account number identified by the corresponding entry in column 1304. Each entry in Column 1306 identifies the MAC address of the customer equipment, e.g., customer set top box, to which the content is streamed. Each entry in column 1308 indicates a session number corresponding to a communications session in which the content is streamed. Each entry in column 1310 indicates an asset identifier which identifies the particular content, e.g., program, being streamed. For example, consider the first row 1312 of table 1300 which includes first entry from each of the column in the table 1300. The information corresponding in row 1312 indicates that some content identified by asset ID "80305" is streamed on date Dec. 24, 2010, time 21:01:46 hours to a customer with billing account number "26012411455" whose set top box MAC address is "00:19:47:FF:1D:2E" in a communications session identified by session number "8675967439562". The table may be generated as part of the normal process of tracking and billing for VOD sessions. One or more of the values in table 13 may, and in some embodiments are, encoded in the streamed content corresponding to a VOD session and used to identify a copy of the streamed content should a copy be made and distributed. For example, time/date, billing account number, MAC address, session number and/or asset ID shown in row 1312 may be embedded using watermarks in the session identified by the session number in row 1312. Table 1300 may, and in some embodiments is, stored and subsequently used in combination with numbers communicated via watermarks, to match content to the session from which the content was copied.

Figure 14:
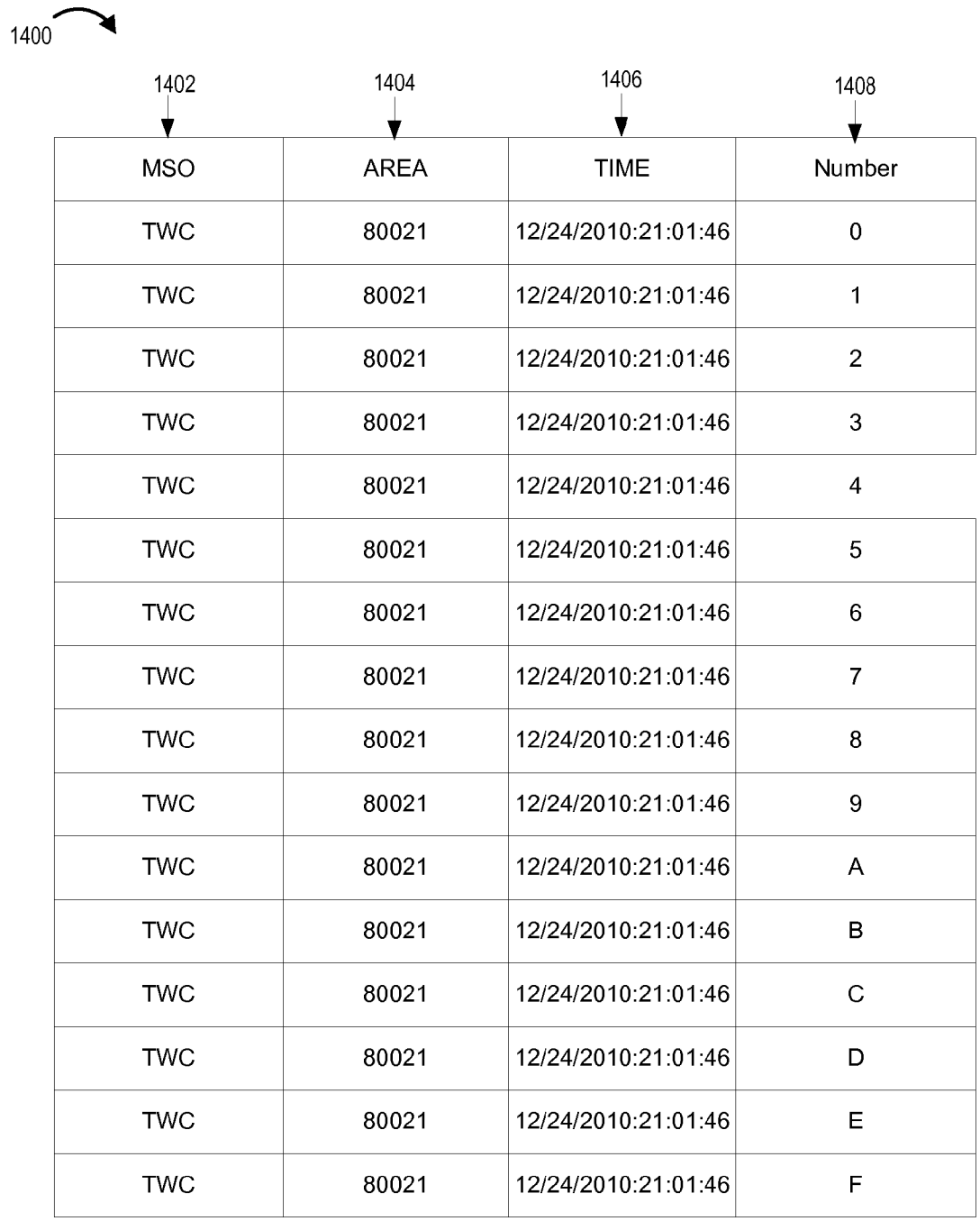
FIG. 14 illustrates an exemplary table which may be used to match particular distributors, areas and times to numerical values which can be communicated using watermarks, in accordance with some embodiments.

FIG. 14 illustrates a table 1400 which may be used to match particular distributors, areas and times to numerical values which can be communicated using watermarks. Column 1402 lists the operator, column 1404 lists the area identifier and column 1406 lists the time. Number 1408 which may be communicated using a watermark, is used to as value which correlates to, and thus communicates, the set of information included in the first three columns of the corresponding row. As can be appreciated, the level of information communicated using a table such as shown in FIG. 14 is much courser than that which is communicated in the FIG. 13 embodiment but still provides a fair amount of useful information.

An exemplary content distribution method in accordance with some embodiments comprises: receiving N watermarked versions of a first content segment, each of the N watermarked versions of the first content segment including a different watermark, N being a positive integer greater than 1; receiving M watermarked versions of a second content segment, each of the M watermarked versions of the second content segment including a different watermark, M being a positive integer greater than 1; and providing, in response to a request for content, a sequence of watermarked content segments including one of said N watermarked versions of the first content segment and one of said M watermarked versions of the second content segment, the sequence of watermarked content segments communicating a corresponding sequence of watermarks providing information identifying content supplied in response to said request for content.

In some embodiments the first and second content segments correspond to a movie or television program. In some embodiments the watermarks correspond to numerical values, said sequence of watermarked content segments communicating a sequence of numerical values communicated by the watermarks included in the watermarked content segments included in said sequence of watermarked content segments.

In some embodiments the content distribution method further comprises storing a record mapping the sequence of numerical values communicated by the watermarks included in the sequence of watermarked content segments communicated in response to said request for content, to a session identifier corresponding to said request for content. In some embodiments the record is a record in a log maintained by a video server which supplied content in response to on-demand video content requests. In some embodiments the sequence of watermarked content segments communicates a plurality of at least X watermarked segments, X being a positive integer greater than 7. In some such embodiments the further comprises selecting each individual one of said X watermarked segments from a set of differently watermarked versions of said individual segment being selected.

In some embodiments selection of at least one watermarked segment from said corresponding set of differently watermarked versions of said individual segment is made as a function of a time. In some embodiments selection of at least one watermarked segment from said corresponding set of differently watermarked versions of said individual segment is made as a function of a geographic region to which said sequence of content segments is being provided. In some embodiments, selection of at least one watermarked segment from said corresponding set of differently watermarked versions of said individual segment is made as a function of an identifier corresponding to a set top box or user to which the request for content corresponds. In some embodiments selection of at least one watermarked segment from said corresponding set of differently watermarked versions of said individual segment is made as a function of a session identifier corresponding to a communications session in which said sequence of content segments is communicated.

In some embodiments selection of at least one watermarked segment from a corresponding set of differently watermarked versions of said individual segment is made as a function of at least one of: i) a time; ii) a geographic region to which said sequence of content segments is being provided; iii) an identifier corresponding to a set top box or user to which the request for content corresponds; iv) a session identifier corresponding to a communications session in which said sequence of content segments is communicated; or v) an identifier corresponding to a regional server distributing said sequence of content segments.

In some embodiments, prior to providing a sequence of watermarked content segments in response to a request for content, the method includes generating a playlist of selected watermarked content segments, said playlist of selected watermarked content segments defining the sequence of watermarked content segments to be provided in response to said request for content; and transmitting said sequence of watermarked content segments in accordance with the generated playlist.

In various embodiments, generating and transmitting steps are performed by a headend, e.g., region 1 headend 110, of a content distribution system which receives said N watermarked versions of the first content segment and said M watermarked versions of the second content segment from another network device. In some embodiments the another network device is a content watermarking and distribution device such as the PMG 108 coupled to a plurality of regional content distribution systems.

An exemplary method of operating an exemplary content watermarking and distribution device in accordance with some embodiments of the invention comprises: receiving content from a content supplier; slicing the received content into a plurality of segments, said plurality of segments including a first content segment and a second content segment; perform a watermarking operation on said first content segment to generate N watermarked versions of said first content segment; and perform a watermarking operation on said second content segment to generate M watermarked versions of said second content segment. In various embodiments the another network device is a package media gateway, e.g., PMG 108. In some embodiments the method of operating the exemplary content watermarking and distribution device includes operating the package media gateway to supply differently watermarked sets of said first and second content segments to different regional content distribution systems.

Numerous variations on the above described methods and apparatus are possible and within the scope of the invention.

For example, in a particular embodiment, a video is sliced at predetermined points such that it is sectioned into a desired number of slices. Each slice, i.e., segment, is then copied 16 times. Note that this is just an example and that as many or few segments that are needed or copied may be used. The size of the segment is also an example and is not intended to be limiting. The size may be several seconds, several minutes, or a fraction of the content, e.g., program, depending on the watermarking technology used. For instance, if an encoding scheme is available to provide 100 unique marks, 100 copies could be used.

Of the 16 exemplary copies, in the particular exemplary embodiment separate copies (0 through 15) are individually watermarked with a unique digit from the pool of hexadecimal values spanning 0 through 0x0F. Assuming R segments were produced from the content, the copying will produce R×16 copies that will be stored. Thus, each segment in the example generates a set of 16 copies and each having a unique number from 0 to 0xF hexadecimal, which is communicated by the watermark introduced into the particular copy.

Note that the use of a single watermarking mechanism in the exemplary embodiment does not preclude the use of multiple watermarking mechanisms in order to encode more detailed information such as the region and company that distributed the content, and such information may be watermarked along the entirety of the content and the session number may be watermarked only on the segments.

When a VOD session is set up or content transferred, in the exemplary embodiment there is an identifier involved. In one embodiment, the identifier is R digits long. Each sequential segment of content that has been watermarked represents temporally spaced information. Thus, starting with the most significant digit of the identifier, e.g. to encode 0xA 0xC, the first slice of the content with the watermark 0xA on it will be placed in the playlist defining the watermarked content segments to be supplied first followed by the second slice of the content containing the watermark 0xC. Attention then goes to the insertion point of the next number and the next slice. In this case, the copy of the third slice with the third digit of the session identifier is inserted into the play list. This continues until all digits and all slices are accounted for.

In another embodiment, the content is only watermarked to contain information describing the geographic location distributed to and a date code. This approach has an advantage in terms of system efficiency in that a single playlist may be generated per region per period of time. The update time of the date code on the content can vary so that the granularity of users becomes finer or coarser depending on what is preferred and/or system loading.

When the playlist is transferred to a VOD server which is part of the streaming apparatus responsible for streaming the content, the VOD server will respond by selecting the content segments in the order they occur in the playlist. Thus, when the segments that are watermarked pass, the receiver may decode the digits. If a user breaks copyright law and stores the content to a disk as one video file, the watermarked digits remain intact and can be used to determine the particular session that generated the video stream, transmitting organization, time, and other identifying information of which session was recorded and illegally distributed.

It should be appreciated that all segments of a program need not be watermarked. In addition advertisements and/or other segments can be introduced between segments of the requested content. The introduced segments may communicate numbers using watermarks in accordance with the present invention or may be disregarded when recovering a sequence communicated by a set of watermarked segments communicated by the requested content.

In some embodiments the identifier communicated by the sequence of watermarked segments is repeated throughout the program or movie. Thus, copying of even a small portion of the program, e.g., 30 seconds worth, tends to result in enough watermarked frames being copied to allow accurate identification of the session and/or original destination device to which the copied content was originally sent.

While the methods and apparatus of the present invention have been described in the context of video streaming, they can be applied to audio streaming as well. In the case of audio streaming the watermarked segments would be, e.g., short audio segments. While described in the context of a video on-demand system, it should be appreciated that the methods and apparatus of the present invention are not limited to the delivery of video content and can be used to support delivery of audio content and/or other types of information content which may be requested by a CP (customer premise) device.

While the methods and apparatus of the present invention are well suited for generating watermarks for prerecorded content, e.g., movies and/or other content from a on-demand content library, the techniques can also be used with real time broadcasts, e.g., broadcasts which are transmitted while the original live event is still ongoing. In the case of real time broadcasts the real time broadcasts are often transmitted with some previously recorded content being inserted between portions of the real time broadcast and/or portions of the images included in the real time broadcast being generated from previously recorded content. For example, pre-recorded advertisements or logos may, and in some embodiments are, inserted into the real time broadcasts. In one particular embodiment, in which the digital content segments of FIG. 9 correspond to real time content, the Advertisements in the generated playlist are selected from sets of differently watermarked advertisement segments which were generated prior to the real time broadcast. Thus in such an embodiment, in the generated playlist 935 Advertisement 1 is selected from N differently watermarked versions of advertisement 1. Similarly Advertisement 2 is selected from a plurality of differently watermarked versions of Advertisement 2 with the sequence of value indicated by the watermarks of the included Advertisement segments identifying the particular content stream.

Thus, in accordance with the invention, in some embodiments a particular advertisement, logo and/or other pre-recorded content to be combined with the real time content is watermarked to generate multiple differently watermarked versions of an advertisement or logo, e.g., with the different watermarked versions communicating different numbers. The prerecorded watermarked content, e.g., advertisements and/or logos, is combined with the real time broadcast.

By selecting which copy of a watermarked logo or image is combined with the real time content, the previously generated watermark is incorporated into one or more real time images. The sequence of watermarks coveys a number or other identification information which identifies the real time content broadcast on a per stream basis without having to generate the watermarks for each of the different streams in real time. Thus, by using conventional advertisement and/or logo insertion techniques and a plurality of differently watermarked versions of advertisements or logos to be inserted, watermarking of real time content streams is possible using the methods of the present invention without having to provide the ability to generate watermarks in real time.

While it is possible to watermark each frame or image of a content stream, it should be appreciated that it is not necessary to do so and that including watermarks in a subset of the images or frames is satisfactory in many implementations. The number of different watermarks generated for each frame or segment can vary and need not be the same for an entire program. Furthermore different portions of a content stream can communicate different watermark sequences. For example, advertisements within a broadcast represented in the form of playlist 935 may communicate one sequence of watermarks while the main program (Digital Content segments of playlist 935) may communicate a different sequence of watermarks. Thus, it should be appreciated that different sets of frames and/or images may be treated as corresponding to or communicating different sets or sequences of watermarked values. This concept can be extended so that different subsets of images corresponding to a program, can communicate different number sequences or sets of watermarked information. In accordance with the invention, the regional distribution systems store information on which images of a program correspond to which sequence of watermarks so that the sequence of values communicated by frames and/or images in a program can be properly reconstructed despite the frames or images being spread out in an image and/or interlaced with frames or images corresponding to a different watermark sequence.

The sequence of values communicated by the selection and inclusion of watermarked versions of a frame or image may repeat within a program so that all or a portion of a identification sequence communicated through the use of watermarks may be conveyed using relatively few frames and/or can be repeated multiple times throughout a program or other piece of streamed content.

In various embodiments system elements described herein are implemented using one or more modules which are used to perform the steps corresponding to one or more methods of the present invention, for example, receiving a user input indicating a request to record content, receiving N watermarked versions of a first content segment, each of the N watermarked versions of the first content segment including a different watermark, N being a positive integer greater than 1; receiving M watermarked versions of a second content segment, each of the M watermarked versions of the second content segment including a different watermark, M being a positive integer greater than 1; and providing, in response to the request for content, a sequence of watermarked content segments including one of said N watermarked versions of the first content segment and one of said M watermarked versions of the second content segment, the sequence of watermarked content segments communicating a corresponding sequence of watermarks providing information identifying content supplied in response to said request for content, etc. Each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a non-transitory machine, e.g., computer, readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A content distribution method, the method comprising:
receiving N watermarked versions of a first content segment, each of the N watermarked versions of the first content segment including a different watermark, N being a positive integer greater than 1;
receiving M watermarked versions of a second content segment, each of the M watermarked versions of the second content segment including a different watermark, M being a positive integer greater than 1;
receiving a session set up request from a customer premise device requesting content, said session set up request being a request for content;
generating a multi-bit session identifier in response to said session set up request;
generating a playlist of watermarked content segments corresponding to the requested content as a function of said multi-bit session identifier, said watermarked content segments in said playlist communicating at least said multi-bit session identifier; and
operating a video on demand server to generate a sequence of watermarked content segments in accordance with said playlist, said sequence of watermarked content segments including one of said N watermarked versions of the first content segment and one of said M watermarked versions of the second content segment, the sequence of watermarked content segments communicating said multi-bit session identifier with the requested content.

2. The method of claim 1,
wherein said playlist is a list of segments which are to be sequentially transmitted in accordance with the playlist to said customer premise device to provide the requested content; and
wherein said first and second content segments correspond to a movie or television program.

3. The method of claim 1, wherein said watermarks correspond to numerical values, said sequence of watermarked content segments communicating a sequence of numerical values communicated by the watermarks included in the watermarked content segments included in said sequence of watermarked content segments.

4. The method of claim 1, further comprising:
storing in a record the session identifier corresponding to said request for content along with billing account number information.

5. The method of claim 4, wherein said record is a record in a log generated by a video server which supplied content in response to on-demand video content requests, said log including records corresponding to multiple different sessions, different records including different multi-bit session identifiers.

6. The method of claim 1, wherein said step of generating a playlist of watermarked content segments includes:
selecting at least some of said watermarked segments from a set of differently watermarked versions of an individual segment as a function of time, said segments in the playlist communicating time information in addition to said multi-bit session identifier.

7. The method of claim 6, wherein the method includes:
selecting for inclusion in said playlist at least one watermarked segment from said corresponding set of differently watermarked versions of said individual segment as a function of a date.

8. The method of claim 6, wherein the method includes:
selecting for inclusion in said playlist at least one watermarked segment from said corresponding set of differently watermarked versions of said individual segment as a function of a geographic region to which said sequence of content segments is being provided.

9. The method of claim 6, wherein the method includes:
selecting for inclusion in said playlist at least one watermarked segment from said corresponding set of differently watermarked versions of said individual segment as a function of an identifier corresponding to a set top box or user to which the request for content corresponds.

10. The method of claim 6, wherein the method includes:
selecting for inclusion in said playlist at least one watermarked segment from said corresponding set of differently watermarked versions of said individual segment as a function of an address of a device from which said request for content was received.

11. The method of claim 6, wherein the method includes:
selecting for inclusion in said playlist at least one watermarked segment from a corresponding set of differently watermarked versions of said individual segment based on at least one of: i) a time; ii) a geographic region to which said sequence of content segments is being provided; iii) an identifier corresponding to a set top box or user to which the request for content corresponds; iv) a session identifier corresponding to a communications session in which said sequence of content segments is communicated; or v) an identifier corresponding to a regional server distributing said sequence of content segments.

12. The method of claim 1, wherein said step of generating a playlist is performed by a first device which is a different device from said video on demand server, the method further comprising:
communicating said generated playlist from the first device to said video on demand server.

13. The method of claim 12, wherein said generating and transmitting steps are performed by a headend of a content distribution system which includes said first device and said video on demand server, the headend receiving said N watermarked versions of the first content segment and said M watermarked versions of the second content segment from another network device.

14. The method of claim 13, wherein said another network device is a content watermarking and distribution device coupled to a plurality of regional content distribution systems, the method further comprising operating said content watermarking and distribution device to:
receive content from a content supplier;
slice the received content into a plurality of segments, said plurality of segments including said first content segment and said second content segment;
perform a watermarking operation on said first content segment to generate said N watermarked versions of said first content segment; and
perform a watermarking operation on said second content segment to generate said M watermarked versions of said second content segment.

15. The method of claim 14, wherein said another network device is a package media gateway, the method further comprising:
operating said package media gateway to supply differently watermarked sets of said first and second content segments to different regional content distribution systems.

16. A content distribution system, comprising:
a video on demand server with access to N watermarked versions of a first content segment, each of the N watermarked versions of the first content segment including a different watermark, N being a positive integer greater than 1, and for receiving M watermarked versions of a second content segment, each of the M watermarked versions of the second content segment including a different watermark, M being a positive integer greater than 1;
an application server configured to:
receive a session set up request from a customer premise device requesting content, said session set up request being a request for content;
generate a multi-bit session identifier in response to said session set up request;
generate a playlist of watermarked content segments corresponding to the requested content as a function of said multi-bit session identifier said watermarked content segments in said playlist communicating at least said multi-bit session identifier;
supply said playlist to said video on demand server; and
wherein said application server is further configured to generate a sequence of watermarked content segments in accordance with said playlist, said sequence of watermarked content segments including one of said N watermarked versions of the first content segment and one of said M watermarked versions of the second content segment, the sequence of watermarked content segments communicating said multi-bit session identifier.

17. The content distribution system of claim 16, wherein said watermarks correspond to numerical values, said sequence of watermarked content segments communicating a sequence of numerical values communicated by the watermarks indicating a time in addition to said multi-bit session identifier.

18. The content distribution system of claim 17, further comprising:
memory for storing a record mapping said session identifier to an identifier of a user device and an identifier of the content which was streamed.

19. The content distribution system of claim 16, wherein said sequence of watermarked content segments communicates a plurality of at least X watermarked segments, X being a positive integer greater than 7; and
wherein said content distribution apparatus further comprises:
means for selecting each individual one of said X watermarked segments from a set of differently watermarked versions of said individual segment being selected.

20. The content distribution system of claim 19, wherein said application server is configured to select at least one watermarked segment from a corresponding set of differently watermarked versions of said individual segment as a function of a geographic region to which said sequence of content segments is being provided.

* * * * *